United States Patent
Garin et al.

(10) Patent No.: US 9,137,639 B2
(45) Date of Patent: Sep. 15, 2015

(54) METHODS AND APPARATUSES FOR USE IN PROVIDING NAVIGATION ASSISTANCE DATA TO MOBILE STATIONS

(71) Applicant: QUALCOMM Incorporated, San Diego, CA (US)

(72) Inventors: Lionel J. Garin, Palo Alto, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/338,287

(22) Filed: Jul. 22, 2014

(65) Prior Publication Data

US 2014/0335892 A1 Nov. 13, 2014

Related U.S. Application Data

(62) Division of application No. 13/187,405, filed on Jul. 20, 2011, now Pat. No. 8,892,118.

(60) Provisional application No. 61/367,340, filed on Jul. 23, 2010, provisional application No. 61/369,548, filed on Jul. 30, 2010.

(51) Int. Cl.
*H04W 24/00* (2009.01)
*H04W 4/04* (2009.01)
(Continued)

(52) U.S. Cl.
CPC .............. *H04W 4/04* (2013.01); *G01C 21/206* (2013.01); *G01S 5/0236* (2013.01); *H04W 4/043* (2013.01); *H04W 12/04* (2013.01); *H04W 64/00* (2013.01)

(58) Field of Classification Search
CPC ....... H04W 4/04; H04W 4/043; H04W 64/00; H04W 12/04; H04W 4/02; G01S 5/0236; H04L 67/18

USPC ........ 455/456.1, 330, 404, 456.6, 457, 456.3, 455/422.1, 426.1; 430/269, 381, 382; 370/338; 345/14.08, 633, 581
See application file for complete search history.

(56) References Cited

U.S. PATENT DOCUMENTS 6,336,073 B1 * 1/2002 Ihara et al. ................... 701/533
7,039,421 B2 5/2006 Couronne et al.
(Continued)

FOREIGN PATENT DOCUMENTS

| CN | 1703627 A | 11/2005 |
|----|-----------|---------|
| EP | 1736792 A1 | 12/2006 |

(Continued)

OTHER PUBLICATIONS

Beal J.R. Jr., et al., "Contextual Geolocation: A Specialized Application for Improving Indoor Location Awareness in Wireless Local Area Networks," College of Graduate Studies and Research, Minnesota State University, Mankato, MN, 2003, 17 pages.

(Continued)

*Primary Examiner* — Mahendra Patel
(74) *Attorney, Agent, or Firm* — Berkeley Law & Technology Group, LLP

(57) ABSTRACT

Methods and apparatuses are provided which may be implemented in various devices to provide navigation assistance data and/or the like to a mobile station with regard to at least one of a plurality of different indoor regions. For example, a computing platform of a map inference device may establish encoded metadata for at least a portion of an indoor region based, at least in part, on an electronic map, an access point locator, or some combination thereof, and provide such encoded metadata to a repository device that may provide at least a portion of the encoded metadata to a mobile station.

69 Claims, 11 Drawing Sheets

(51) Int. Cl.
 *G01C 21/20* (2006.01)
 *G01S 5/02* (2010.01)
 *H04W 12/04* (2009.01)
 *H04W 64/00* (2009.01)

(56) References Cited

U.S. PATENT DOCUMENTS

| | | |
|---|---|---|
| 7,424,532 B1 | 9/2008 | Subbiah |
| 7,751,971 B2 | 7/2010 | Chang et al. |
| 8,164,444 B2 | 4/2012 | Anderson et al. |
| 2002/0164952 A1* | 11/2002 | Singhal et al. .................. 455/41 |
| 2002/0171581 A1* | 11/2002 | Sheynblat et al. ....... 342/357.09 |
| 2003/0011467 A1 | 1/2003 | Suomela |
| 2003/0236618 A1* | 12/2003 | Kamikawa et al. ........... 701/211 |
| 2005/0204057 A1 | 9/2005 | Anderson et al. |
| 2005/0271072 A1 | 12/2005 | Anderson et al. |
| 2006/0010237 A1 | 1/2006 | Banatre et al. |
| 2006/0034326 A1 | 2/2006 | Anderson et al. |
| 2006/0087425 A1 | 4/2006 | Haeberlen et al. |
| 2006/0142027 A1 | 6/2006 | Krishnamurthi et al. |
| 2006/0212561 A1 | 9/2006 | Feng |
| 2007/0001950 A1 | 1/2007 | Zhang et al. |
| 2007/0116453 A1 | 5/2007 | Uchiyama |
| 2007/0139411 A1 | 6/2007 | Jawerth et al. |
| 2007/0184845 A1 | 8/2007 | Troncoso |
| 2007/0201421 A1 | 8/2007 | Huseth |
| 2008/0133124 A1* | 6/2008 | Sarkeshik ..................... 701/201 |
| 2009/0043502 A1* | 2/2009 | Shaffer et al. ................. 701/213 |
| 2009/0174600 A1* | 7/2009 | Mazlum et al. .......... 342/357.12 |
| 2009/0271271 A1 | 10/2009 | Johnson |
| 2010/0036717 A1 | 2/2010 | Trest |
| 2010/0048163 A1 | 2/2010 | Parr et al. |
| 2010/0120450 A1 | 5/2010 | Herz |
| 2010/0151882 A1 | 6/2010 | Gillies et al. |
| 2010/0156713 A1 | 6/2010 | Harper |
| 2010/0157848 A1 | 6/2010 | Das et al. |
| 2010/0217723 A1 | 8/2010 | Sauerwein, Jr. et al. |
| 2011/0034184 A1 | 2/2011 | Rothschild |
| 2011/0081919 A1* | 4/2011 | Das et al. ................... 455/456.1 |
| 2011/0087431 A1 | 4/2011 | Gupta et al. |
| 2011/0090123 A1 | 4/2011 | Sridhara et al. |
| 2011/0116453 A1 | 5/2011 | Huang et al. |
| 2011/0138064 A1 | 6/2011 | Rieger et al. |
| 2011/0173565 A1 | 7/2011 | Ofek et al. |
| 2011/0178703 A1 | 7/2011 | Aben et al. |
| 2011/0244887 A1 | 10/2011 | Dupray et al. |
| 2011/0248887 A1 | 10/2011 | Whelan et al. |
| 2011/0250904 A1 | 10/2011 | Valletta et al. |
| 2011/0274000 A1 | 11/2011 | King et al. |
| 2011/0282947 A1 | 11/2011 | Dodson |
| 2011/0285591 A1* | 11/2011 | Wong ............................ 342/451 |
| 2012/0021762 A1 | 1/2012 | Garin et al. |
| 2012/0028649 A1 | 2/2012 | Gupta et al. |
| 2012/0028654 A1 | 2/2012 | Gupta et al. |
| 2012/0190386 A1* | 7/2012 | Anderson .................. 455/456.3 |
| 2014/0315575 A1 | 10/2014 | Gupta et al. |
| 2014/0315580 A1 | 10/2014 | Gupta et al. |
| 2014/0315581 A1 | 10/2014 | Gupta et al. |

FOREIGN PATENT DOCUMENTS

| | | |
|---|---|---|
| JP | 2001358850 A | 12/2001 |
| JP | 2002296064 A | 10/2002 |
| JP | 2003161772 A | 6/2003 |
| JP | 2004048289 A | 2/2004 |
| JP | 2004350088 A | 12/2004 |
| JP | 2005070115 A | 3/2005 |
| JP | 2006502396 A | 1/2006 |
| JP | 2006108959 A | 4/2006 |
| JP | 2007066290 A | 3/2007 |
| JP | 2008033043 A | 2/2008 |
| JP | 2008112256 A | 5/2008 |
| JP | 2008537102 A | 9/2008 |
| JP | 2009020070 A | 1/2009 |
| JP | 2009055138 A | 3/2009 |
| JP | 2009545922 A | 12/2009 |
| JP | 2010159980 A | 7/2010 |
| JP | 2010164434 A | 7/2010 |
| KR | 20050057626 A | 6/2005 |
| WO | WO-2004034081 A1 | 4/2004 |
| WO | WO-2008019094 A2 | 2/2008 |
| WO | WO-2008064535 A1 | 6/2008 |
| WO | WO-2009071394 A1 | 6/2009 |
| WO | WO-2010022797 A1 | 3/2010 |
| WO | WO-2010059934 A2 | 5/2010 |
| WO | WO-2010075341 A1 | 7/2010 |

OTHER PUBLICATIONS

International Search Report and Written Opinion—PCT/US2011/044821, ISA/EPO—Oct. 27, 2011.

Miu, Design and Implementation of an Indoor Mobile Navigation System, Master of Science Thesis, Massachusetts Institute of Technology, pp. 1-60, Cambridge, Massachusetts, 2002.

\* cited by examiner

METHODS AND APPARATUSES FOR USE IN PROVIDING NAVIGATION ASSISTANCE DATA TO MOBILE STATIONS

This patent application is a Divisional Patent Application of U.S. patent application Ser. No. 13/187,405, filed Jul. 20, 2011, titled, "METHODS AND APPARATUSES FOR USE IN PROVIDING NAVIGATION ASSISTANCE DATA TO MOBILE STATIONS", which claims benefit of and priority to U.S. Provisional Patent Application 61/367,340, filed Jul. 23, 2010, titled, "INDOOR POSITIONING SERVER ARCHITECTURE", and also U.S. Provisional Patent Application 61/369,548, filed Jul. 30, 2010, titled, "MOBILE-SERVER ARCHITECTURE OPTIONS", each of which is assigned to the assignee hereof, and each of which is incorporated herein by reference.

BACKGROUND

1. Field

The subject matter disclosed herein relates to electronic devices, and more particularly to methods and apparatuses for use in various devices comprising computing platforms and/or mobile stations to provide navigation assistance data and/or the like to a mobile station with regard to at least one of a plurality of different indoor regions.

2. Information

The Global Positioning System (GPS) represents one type of Global Navigation Satellite System (GNSS), which along with other types of satellite positioning systems (SPS) provide or otherwise support signal-based position location capabilities (e.g., navigation functions) in mobile stations, and particularly in outdoor environments. However, since some satellite signals may not be reliably received and/or acquired by a mobile station within an indoor environment or other like mixed indoor/outdoor environments, different techniques may be employed to enable position location services.

For example, mobile stations may attempt to obtain a position fix by measuring ranges to three or more terrestrial transmitters (e.g., wireless access points, beacons, cell towers, etc.) which are positioned at known locations. Such ranges may be measured, for example, by obtaining a MAC ID address from signals received from such transmitters and obtaining range measurements to the transmitters by measuring one or more characteristics of signals received from such transmitters such as, for example, signal strength, a round trip delay time, etc.

These and other like position location and navigation techniques tend to be of further benefit to a user if presented with certain mapped features. For example, mapped features may relate to or otherwise identify certain physical objects, characteristics, or points of interest within a building or complex, etc. Thus, in certain instances, an indoor navigation system may provide a digital electronic map to a mobile station upon entering a particular indoor area, e.g., in response to a request for navigation assistance data. Such a map may show indoor features such as doors, hallways, entry ways, walls, etc., points of interest such as bathrooms, pay phones, room names, stores, etc. Such a digital electronic map may be stored at a server to be accessible by a mobile station through selection of a URL, for example. By obtaining and displaying such a map, a mobile station may overlay a current location of the mobile station (and user) over the displayed map to provide the user with additional context.

In certain instances, some of the information that may be provided to and/or otherwise used by a mobile station for navigational or other like purposes may have significant value, e.g., the information may comprise intellectual property or otherwise relate to a proprietary capability, etc. In some instances, some information may be confidential or otherwise relate to some aspect wherein privacy or secrecy may be desired. Thus, it may be useful to not only provide such information in an efficient manner, but to also carefully control the dissemination of such information as it is transmitted, stored, and/or processed by the various devices and communications resources.

SUMMARY

Methods and apparatuses are provided by way of example which may be implemented in various devices to provide navigation assistance data and/or the like to a mobile station with regard to at least one of a plurality of different indoor regions.

In accordance with certain example implementations, a method may be implemented at one or more computing platforms of a map inference device. Such a method may comprise: obtaining, for at least a portion of at least one indoor region, at least one of: an electronic map or an access point locator; establishing encoded metadata for at least the portion of the at least one indoor region based, at least in part, on at least one of: the electronic map or the access point locator; and transmitting the encoded metadata to a repository device, the repository device to provide at least a portion of the encoded metadata to a mobile station in response to a request for navigation assistance data received from the mobile station.

In accordance with certain example implementations, an apparatus may be implemented for use at a map inference device, such an apparatus may comprise: means for obtaining, for at least a portion of at least one indoor region, at least one of: an electronic map or an access point locator; means for establishing encoded metadata for at least the portion of the at least one indoor region based, at least in part, on at least one of: the electronic map or the access point locator; and means for transmitting the encoded metadata to a repository device, the repository device to provide at least a portion of the encoded metadata to a mobile station in response to a request for navigation assistance data received from the mobile station.

In accordance with certain example implementations, one or more computing platforms may be provided for use at a map inference device which comprises: at least one network interface; and at least one processing unit to: obtain via the network interface, for at least a portion of at least one indoor region, at least one of: an electronic map or an access point locator; establish encoded metadata for at least the portion of the at least one indoor region based, at least in part, on at least one of: the electronic map or the access point locator; and initiate transmission of the encoded metadata via the network interfaces to a repository device, the repository device to provide at least a portion of the encoded metadata to a mobile station in response to a request for navigation assistance data received from the mobile station.

In accordance with certain example implementations, an article of manufacture may be provided which comprises at least one non-transitory computer readable medium having stored therein computer implementable instructions that are executable by a processing unit in an inference device to: obtain, for at least a portion of at least one indoor region, at least one of: an electronic map or an access point locator; establish encoded metadata for at least the portion of the at least one indoor region based, at least in part, on at least one of: the electronic map or the access point locator; and initiate transmission of the encoded metadata to a repository device, the repository device to provide at least a portion of the encoded metadata to a mobile station in response to a request for navigation assistance data received from the mobile station.

In accordance with certain example implementations, a method may be implemented at a directory device which comprises: obtaining, for at least a portion of at least one indoor region, at least one of: an electronic map or an access point locator; establishing encoded metadata for at least the portion of the at least one indoor region based, at least in part, on at least one of: the electronic map or the access point locator; transmitting the encoded metadata to a repository device; receiving a request for a repository device identifier from a mobile station, the request for the repository device identifier being indicative of at least a first estimated location of the mobile station; and in response to determining that the first estimated location corresponds to the at least the portion of the at least one indoor region, transmitting a repository device identifier for the repository device to the mobile station.

In accordance with certain example implementations, an apparatus may be provided for use in a directory device, such an apparatus may comprise: means for obtaining, for at least a portion of at least one indoor region, at least one of: an electronic map or an access point locator; means for establishing encoded metadata for at least the portion of the at least one indoor region based, at least in part, on at least one of: the electronic map or the access point locator; means for transmitting the encoded metadata to a repository device; means for receiving a request for a repository device identifier from a mobile station, the request for the repository device identifier being indicative of at least a first estimated location of the mobile station; and means for transmitting a repository device identifier for the repository device to the mobile station, in response to a determination that the first estimated location corresponds to the at least the portion of the at least one indoor region.

In accordance with certain example implementations, at least one computing platform may be implanted at a directory device which comprises: a network interface; and a processing unit to: obtain via the network interface, for at least a portion of at least one indoor region, at least one of: an electronic map or an access point locator; establish encoded metadata for at least the portion of the at least one indoor region based, at least in part, on at least one of: the electronic map or the access point locator; initiate transmission of the encoded metadata to a repository device via the network interface; obtain a request for a repository device identifier from a mobile station via the network interface, the request for the repository device identifier being indicative of at least a first estimated location of the mobile station; and in response to a determination that the first estimated location corresponds to the at least the portion of the at least one indoor region, initiate transmission of a repository device identifier for the repository device to the mobile station via the network interface.

In accordance with certain example implementations, an article of manufacture may be provided which comprises at least one non-transitory computer readable medium having stored therein computer implementable instructions that are executable by a processing unit in a directory device to: obtain, for at least a portion of at least one indoor region, at least one of: an electronic map or an access point locator; establish encoded metadata for at least the portion of the at least one indoor region based, at least in part, on at least one of: the electronic map or the access point locator; initiate transmission of the encoded metadata to a repository device via the network interface; obtain a request for a repository device identifier from a mobile station, the request for the repository device identifier being indicative of at least a first estimated location of the mobile station; and initiate transmission of a repository device identifier for the repository device to the mobile station, in response to a determination that the first estimated location corresponds to the at least the portion of the at least one indoor region.

In accordance with certain example implementations, a method may be implemented at a repository device, which comprises: obtaining encoded metadata for at least a portion of at least one indoor region corresponding to at least one of an electronic map or an access point locator; receiving a request for navigation assistance data for at least one indoor region from a mobile station; and transmitting at least a portion of the navigation assistance data to the mobile station, the navigation assistance data comprising, at least in part, the encoded metadata and at least a portion of at least one of: the electronic map or the access point locator corresponding to the encoded metadata.

In accordance with certain example implementations, an apparatus may be provided for use in a repository device, comprising: means for obtaining encoded metadata for at least a portion of at least one indoor region corresponding to at least one of an electronic map or an access point locator; means for receiving a request for navigation assistance data for at least one indoor region from a mobile station; and means for transmitting at least a portion of the navigation assistance data to the mobile station, the navigation assistance data comprising, at least in part, the encoded metadata and at least a portion of at least one of: the electronic map or the access point locator corresponding to the encoded metadata.

In accordance with certain example implementations, at least one computing platform may be provided at a repository device, comprising: at least one network interface; and at least one processing unit to: obtain encoded metadata for at least a portion of at least one indoor region corresponding to at least one of an electronic map or an access point locator; obtain a request for navigation assistance data for at least one indoor region from a mobile station via the network interface; and initiate transmission of at least a portion of the navigation assistance data to the mobile station via the network interface, the navigation assistance data comprising, at least in part, the encoded metadata and at least a portion of at least one of: the electronic map or the access point locator corresponding to the encoded metadata.

In accordance with certain example implementations, an article of manufacture may be provided comprising at least one non-transitory computer readable medium having stored therein computer implementable instructions that are executable by a processing unit in a repository device to: obtain encoded metadata for at least a portion of at least one indoor region corresponding to at least one of an electronic map or an access point locator; obtain a request for navigation assistance data for at least one indoor region from a mobile station; and initiate transmission of at least a portion of the navigation assistance data to the mobile station, the navigation assistance data comprising, at least in part, the encoded metadata and at least a portion of at least one of: the electronic map or the access point locator corresponding to the encoded metadata.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
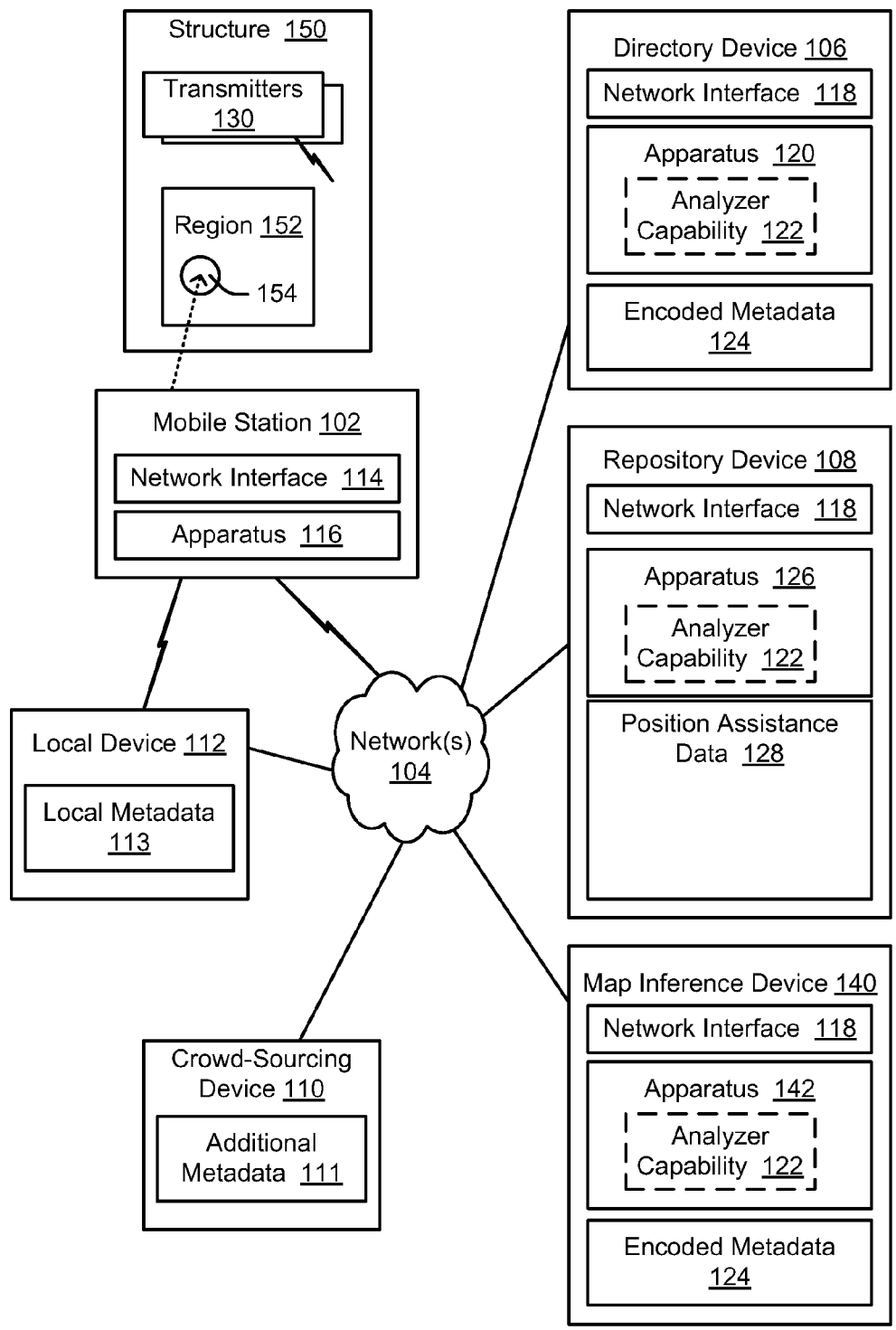
FIG. 1 is a schematic block diagram illustrating an example environment that includes a mobile station and several devices for use in providing navigation assistance data and/or the like to a mobile station with regard to at least one of a plurality of different indoor regions, in accordance with an implementation.

As described in greater detail herein, various methods and apparatuses are provided which may be implemented in various devices to provide navigation assistance data and/or the like to a mobile station with regard to at least one of a plurality of different indoor regions.

By way of initial example, a method may be implemented at a mobile station to obtain navigation assistance data with regard to at least one of a plurality of different indoor regions from a repository device. As part of such an example method, a mobile station may initially contact a directory device which may be able to inform the mobile station as to a particular repository device that the mobile station should contact to obtain applicable navigation assistance data with regard to an indoor region. For example, a mobile station may transmit a request for a repository device identifier to a directory device. Such a request may, for example, being indicative of at least a first estimated location of the mobile station, e.g., identify or hint at a rough or general location. For example, a mobile station may indicate its last known estimated location, or other information that may infer or relate to its current location or surroundings.

A mobile station may then receive a response from the directory device that identifies a repository device. The response may also identify at least one indoor region corresponding to the first estimated location, e.g., via the specific repository identifier, and/or possibly via other additional identifying information. For example, a Uniform Resource Locator (URL) or other like unique address/identifier may be provided for a repository device, and a location context identifier (LCI) and/or other like unique identifier may be provided with regard to an indoor region.

A mobile station may then transmit a request for navigation assistance data for an indoor region to a repository device. Thus, with such a request, a mobile station may request one or more particular data files that may be of use while the mobile station may be in or around an indoor region. For example, data associated with an electronic map or an access point locator may be of use in various functions that the mobile station may provide, e.g., positioning functions, navigation functions, location based service functions, etc. In certain instances, it maybe beneficial for navigation assistance data to comprise encoded metadata for at least a portion an indoor region, and which may, for example, correspond to an electronic map and/or an access point locator. For example, encoded metadata may comprise routing and/or feasibility information, point of interest (POI) information, etc., which may be useful in navigating an indoor region.

Accordingly, in certain example implementations, a mobile station may then receive applicable navigation assistance data from a repository device, wherein the navigation assistance data may comprise, at least in part, encoded metadata for at least a portion of an indoor region. The mobile station may, for example, decode or otherwise process the encoded metadata (if needed) for use by at least one function.

In certain example implementations, all or part of the encoded metadata may be encrypted for security purposes. Thus, in certain instances, a mobile station may obtain a decryption key and perform applicable decryption of the encoded metadata. In certain instances, a mobile station may receive a decryption key from a directory device. Thus, a repository device and/or any other intermediary resources/devices may not have full access to all of the information within the encoded metadata.

In certain example implementations, at least a portion of the encoded metadata may be established, at least in part, by an analyzer capability that may be provided, in whole or part, via a directory device and/or a repository device. In certain instances, at least a portion of encoded metadata may be established prior to a mobile station transmitting a request for navigation assistance data and stored at the repository device, for example. In certain other instances, at least a portion of encoded metadata may be established in response to a request for navigation assistance data, e.g., generated "on-the-fly".

In certain example implementations, a mobile station may further determine a second estimated location, e.g., within an indoor region based, at least in part, on the received navigation assistance data. For example, a positioning function or navigation function may determine a more accurate location estimate based on signal measurements and radio models or heatmaps, etc., as may be provided in navigation assistance data (e.g., in an access point locator).

In certain example implementations, a mobile station may interface with other devices. For example, a mobile station may transmit collected data relating to an indoor region to a crowd-sourcing device and/or the like. For example, a mobile station may receive additional metadata for an indoor region from a crowd-sourcing device and/or the like, which may be provided to and used in at least one function. In another example, a mobile station may receive local metadata for an indoor region from a local device and/or the like, which may be provided to and used in at least one function, e.g., a positioning function, a navigation function, a location based service function, and/or the like.

In accordance with another aspect, a method may be implemented at a map inference device. For example, a map inference device may obtain an electronic map and/or an access point locator which relate to at least a portion of at least one indoor region. For example, a map inference device may obtain an electronic map and/or an access point locator from a particular repository device for a particular LCI, etc. A map inference device may then, for example, use one or more known analyzer capabilities to establish encoded metadata for at least a portion of such an indoor region based, at least in part, on the corresponding electronic map and/or access point locator. A map inference device may then transmit the resulting encoded metadata to the applicable repository device. In certain instances, encoded metadata may be encrypted, for example, at a directory device.

In accordance with another aspect, a method may be implemented at a directory device. For example, a directory device may obtain an electronic map and/or an access point locator which relate to at least a portion of at least one indoor region. For example, a directory device may obtain an electronic map and/or an access point locator from a particular repository device for a particular LCI, etc. A directory device may then, for example, use one or more known analyzer capabilities to establish encoded metadata for at least a portion of such an indoor region based, at least in part, on the corresponding electronic map and/or access point locator. A directory device may then transmit the resulting encoded metadata to the applicable repository device. In certain instances, encoded metadata may be encrypted, for example, at a directory device, a map inference device, and/or the like.

Additionally, a directory device may, for example, receive a request for a repository device identifier from a mobile station, and which indicates in some manner at least a first estimated location of the mobile station. A directory device may then, for example, determine that the first estimated location corresponds to at least a portion of at least one indoor region, and transmit a repository device identifier for an applicable repository device to the mobile station.

In certain example implementations, a directory device may also transmit, to the mobile station, one or more identifiers for an applicable electronic map, an applicable access point locator, the encoded metadata, and/or the like, that may be stored at or otherwise available via an applicable repository device. In certain instances, a directory device may transmit a decryption key corresponding to such an encryption key to a mobile station.

In certain example implementations, a directory device may obtain additional metadata relating to an indoor region, e.g., from a crowd-sourcing device and/or the like, possibly establish encoded metadata based further, at least in part, on at least a portion of the additional metadata.

In certain example instances, at least a portion of encoded metadata may be established, at least in part, prior to receiving a request for a repository device identifier from the mobile station. In certain example instances, at least a portion of encoded metadata may be established, at least in part, in response to a request for a repository device identifier from a mobile station and/or possibly a request received from a repository device and/or the like. Of course in other instances, a directory device may actively refine, update, or otherwise re-establish encoded metadata for other reasons, e.g., changes in maps, improved analysis techniques, a passage of time, new encryption schemes, new data compression techniques, etc.

With this above examples in mind, in accordance with another aspect, a method may be implemented a repository device. For example, a repository device may obtain encoded metadata for at least a portion of at least one indoor region. Thus, for example, encoded metadata may be received from a directory device, etc., and/or possibly established at the repository device.

A repository device may, for example, receive a request for navigation assistance data for at least one indoor region from a mobile station. A repository device may then transmit at least a portion of applicable navigation assistance data to the mobile station. Here, for example, such transmitted navigation assistance data may comprise applicable encoded metadata, and a corresponding electronic map and/or access point locator.

In certain example instances, a repository device may obtain additional metadata for an indoor region from a crowd-sourcing device and/or the like, and establish at least the portion of applicable encoded metadata based, at least in part, on at least a portion of the additional metadata.

In certain example instances, a repository device may establish all or part of an electronic map and/or all or part of an access point locator based, at least in part, on at least one venue diagram for an indoor region. For example, a computer aided design (CAD) diagram and/or other like file(s) may be processed via a map extraction phase to establish all or part of an electronic map and/or all or part of an access point locator.

As may be appreciated, there may be one or more repository devices and one or more directory devices, however in certain example implementations, it may be beneficial to provide substantially fewer, possibly more "centralized" or computationally powerful directory devices than repository devices. In such cases, one or more of the devices (e.g., directory device 106, repository device 108, inference device 140, or the like) may be implemented in the same physical device or server. Of course, in some example implementations, various server farms and/or cloud computing arrangements may be configured to adapt as needed to serve as such devices.

As used herein the term "structure" may, for example, apply to (all or part of) one or more natural and/or man-made physical arrangements of object(s), the knowledge of which may be of use to a user of mobile station. For example, a structure may comprise all or part of a building that a user of a mobile station may enter into, exit from, and/or otherwise move about within. Some example structures may comprise a mixture of indoor and outdoor spaces.

As used herein the term "region" may, for example, relate to all or part of a structure that may be distinguished in some manner. In certain instances, for example, two or more different regions may be distinguished from one another based, at least in part, on various physical arrangements of objects, e.g., floors, ceilings, decks, walls, staircases, elevators, walkways, etc. Thus, for example, two or more regions of a structure may relate to two or more different levels (e.g., floors) of a building, two or more office suites in a building, stores in a shopping mall, etc.

FIG. 1 is a schematic block diagram illustrating an example environment 100 that includes a mobile station 102 and several devices for use in providing navigation assistance data 128 and/or the like to mobile station 102 with regard to at least one of a plurality of different indoor regions 152, in accordance with an implementation.

By way of example, mobile station 102 may comprise any electronic device that may be moved about by a user within a structure and which comprises a network interface 114 for receiving signals transmitted by transmitters 130 (e.g., access points, cell towers, etc.) and/or other resources in network(s) 104, etc. Thus, by way of some examples, mobile station 102 may comprise a cell phone, a smart phone, a computer (e.g., a personal computer such as a laptop computer, a tablet computer, a wearable computer, etc.), a navigation aid, a digital book reader, a gaming device, a music and/or video player device, a camera, etc.

Apparatus 116 is representative of circuitry, such as, e.g., hardware, firmware, a combination of hardware and software, and/or a combination of firmware and software or other like logic that may be provided in mobile station 102 for use in obtaining navigation assistance data 128.

In certain example implementations, mobile station 102 may function exclusively or selectively as a stand-alone device, and may provide a one or more capabilities/services of interest/use to a user. In certain example implementations, mobile station 102 may communicate in some manner with one or more other devices, for example, as illustrated by the wireless communication link to the cloud labeled network(s) 104. Network(s) 104 may be representative of one or more communication and/or computing resources (e.g., devices and/or services) which mobile station 102 may communicate with or through, e.g., via network interface 114 using one or more wired or wireless communication links. Thus, in certain instances mobile station 102 may receive (or send) data and/or instructions via network(s) 104. In certain instances, mobile station 102 may, for example, not only receive a signal from a transmitter 130, but may also transmit a signal to such a transmitter (e.g., having a receiver).

In certain example implementations, mobile station 102 may be enabled to receive signals associated with one or more wireless communication networks, location services, and/or the like or any combination thereof which may be associated with one or more transmitters 130 and/or network(s) 104.

Mobile station 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, mobile station 102 may be enabled (e.g., via network interface 114 or other location receiver) for use with various location service(s), such as, a Global Navigation Satellite System (GNSS), or other like satellite and/or terrestrial locating service, a location based service (e.g., via a cellular network, a WiFi network, etc.).

As illustrated in FIG. 1, mobile station 102 may be located at a location 154 in a region 152 of a structure 150. By way of example, navigation assistance data 128 may be obtained which includes information that may be processed and/or otherwise presented or used in some manner by mobile station 102 to assist in supporting one or more functions, e.g., positioning or navigation functions, as a user moves with mobile station within and/or nearby structure 150 and/or region 152.

An example directory device 106 is illustrated as being connected to network(s) 104 via a network interface 118, which in certain implementations may be similar to network interface 114. Directory device 106 may, for example, comprise one or more computing platforms, e.g., servers, etc., which may provide an apparatus 120. Apparatus 120 may, for example, comprise an analyzer capability 122 that may establish all or part of encoded metadata 124. Directory device 106 may transmit encoded metadata 124 to a repository device 108, e.g., via network interface 118, network(s) 104, and a network interface 118 in repository device 108. As previously mentioned and further illustrated in subsequent examples, apparatus 120 may also process requests for information received via network interface 118 and initiate transmission of responses thereto.

Example repository device 108 is illustrated as being connected to network(s) 104 via its network interface 118, which in certain implementations may be similar to network interface 114. Repository device 108 may, for example, comprise one or more computing platforms, e.g., servers, etc., which may provide an apparatus 126. Repository device 108 may receive encoded metadata 124 from directory device 106, e.g., via network interface 118, network(s) 104, and a network interface 118 in directory device 106. In certain instances, apparatus 126 may, for example, comprise an analyzer capability 122 that may establish all or part of encoded metadata 124. As previously mentioned and further illustrated in subsequent examples, apparatus 126 may also process requests for information received via network interface 118 and initiate transmission of responses thereto. As illustrated, apparatus 126 may, for example, establish, maintain, or store navigation assistance data 128, which may include all or part of encoded metadata 124.

An example map inference device 140 is illustrated as being connected to network(s) 104 via a network interface 118, which in certain implementations may be similar to network interface 114. Map inference device 140 may, for example, comprise one or more computing platforms, e.g., servers, etc., which may provide an apparatus 142. Apparatus 142 may, for example, comprise an analyzer capability 122 that may establish all or part of encoded metadata 124. Map inference device 140 may transmit encoded metadata 124 to a repository device 108, e.g., via network interface 118, network(s) 104, and a network interface 118 in repository device 108.

Also illustrated in FIG. 1, is an example, crowd-sourcing device 110, which may, for example, comprise one or more computing platforms, e.g., servers, etc., and may establish, maintain, or store additional metadata 111, and/or provide such to other devices and/or mobile station 102, e.g., via network(s) 104.

Similarly, a local device 112 which, for example, may comprise one or more computing platforms, e.g., servers, etc., may be provided which is capable of establishing, maintaining, storing, and/or providing local metadata 113, to other devices and/or mobile station 102, e.g., via network(s) 104, or possibly via a direct wireless link (which while shown outside of network(s) 104, may be provided within network(s) 104 too).

It should be understood that, while FIG. 1 shows an example implementation wherein all or part of an analyzer capability 122 may be implemented at certain devices to establish all or part of encoded metadata 124, in certain instances all or part of such analyzer capability 122, and/or all or part of encoded metadata 124 may be different at the various different devices. Furthermore, it should be understood that, in certain other example implementations, all or parts of two or more devices (e.g., directory device 106, repository device 108, inference device 140, or the like) may be co-located within a particular device.

Figure 2:
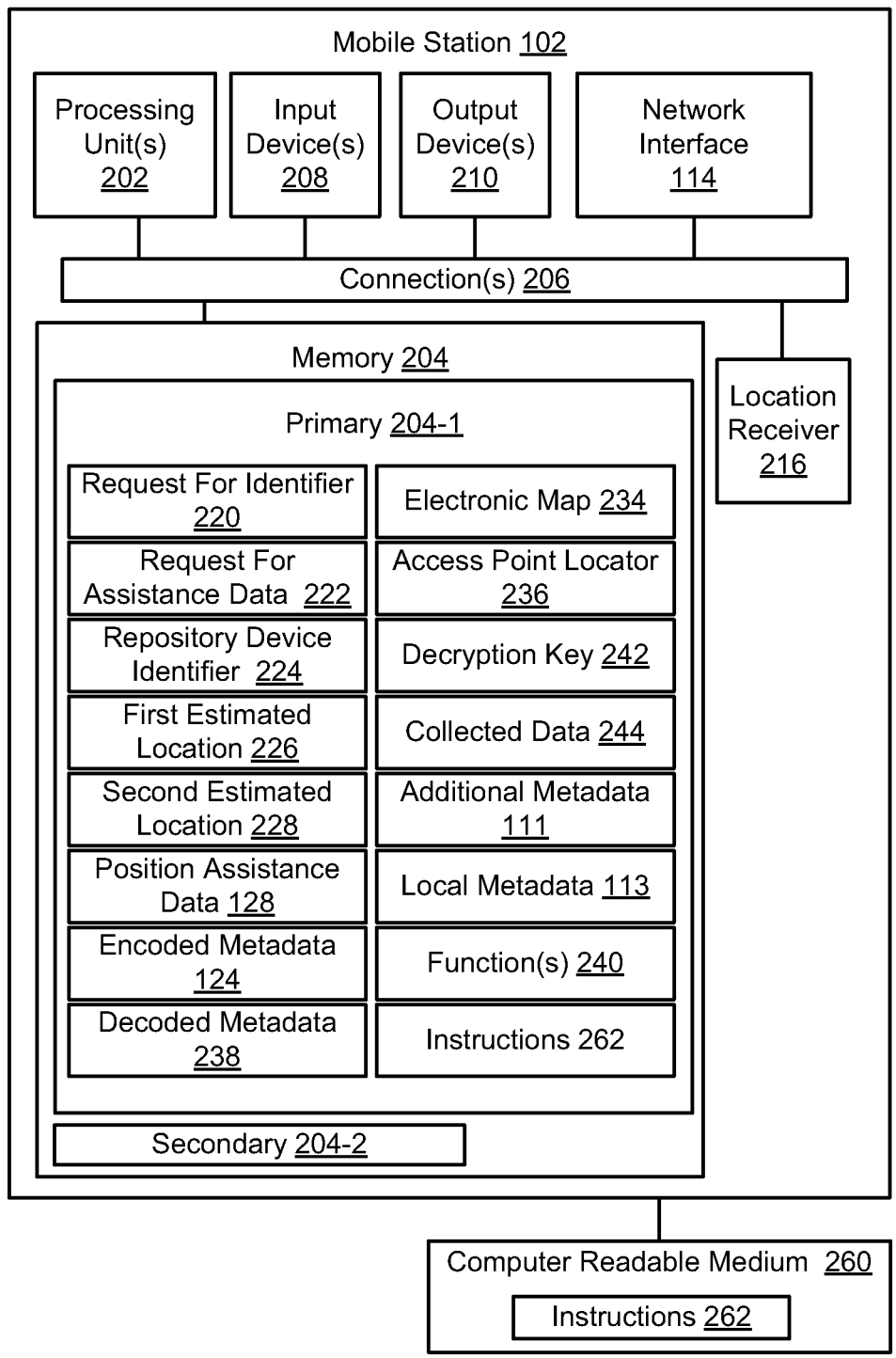
FIG. 2 is a schematic block diagram illustrating certain features of an example mobile station for use in obtaining and using navigation assistance data and/or the like with regard to at least one of a plurality of different indoor regions, in accordance with an implementation.

FIG. 2 is a schematic block diagram illustrating certain features of an example mobile station 102 for use in obtaining and using navigation assistance data 128, in accordance with an implementation.

As illustrated mobile station 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile station 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 260. Memory 204 and/or computer readable medium 260 may comprise instructions 262 associated with data processing, e.g., in accordance with the techniques and/or apparatus 116 (FIG. 1), as provided herein.

Mobile station 102 may, for example, further comprise one or more user input devices 208, one or more output devices 210, one or more network interfaces 114, and/or one or more location receivers 216.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 130 and/or network(s) 104 (FIG. 1), e.g., via one or more wired and/or wireless communication links. Location receiver 216 may, for example, obtain signals from one or more location services, which may be used in estimating a location that may be provided to or otherwise associated with one or more signals stored in memory. For example, a location receiver may be used to estimate a first location that may indicate (possibly roughly) that mobile station 102 is at or nearby, or possibly approaching a particular structure/region.

Processing unit(s) 202 and/or instructions 262 may, for example, provide or otherwise be associated with one or more signals stored in memory 204, such as, one or more requests for a repository device identifier 220, one or more requests for assistance data 222, one or more repository device identifiers 224, a first estimated location 226, a second estimated location 228, navigation assistance data 128, encoded metadata 124, decoded metadata 238, one or more electronic maps 234, one or more access point locators 236, one or more decryption keys 242, collected data 244, additional metadata 111, local metadata 113, instructions and/or data for or supportive of one or more functions 240 and/or the like or any combination thereof, e.g., as described in the various example techniques herein.

Function(s) 240 may, for example, comprise all or part of a positioning function, a navigation function, a location based service function, or the like or any combination thereof that may be used, at least in part, to estimate a location of mobile station 102 within at least one indoor region.

Figure 3:
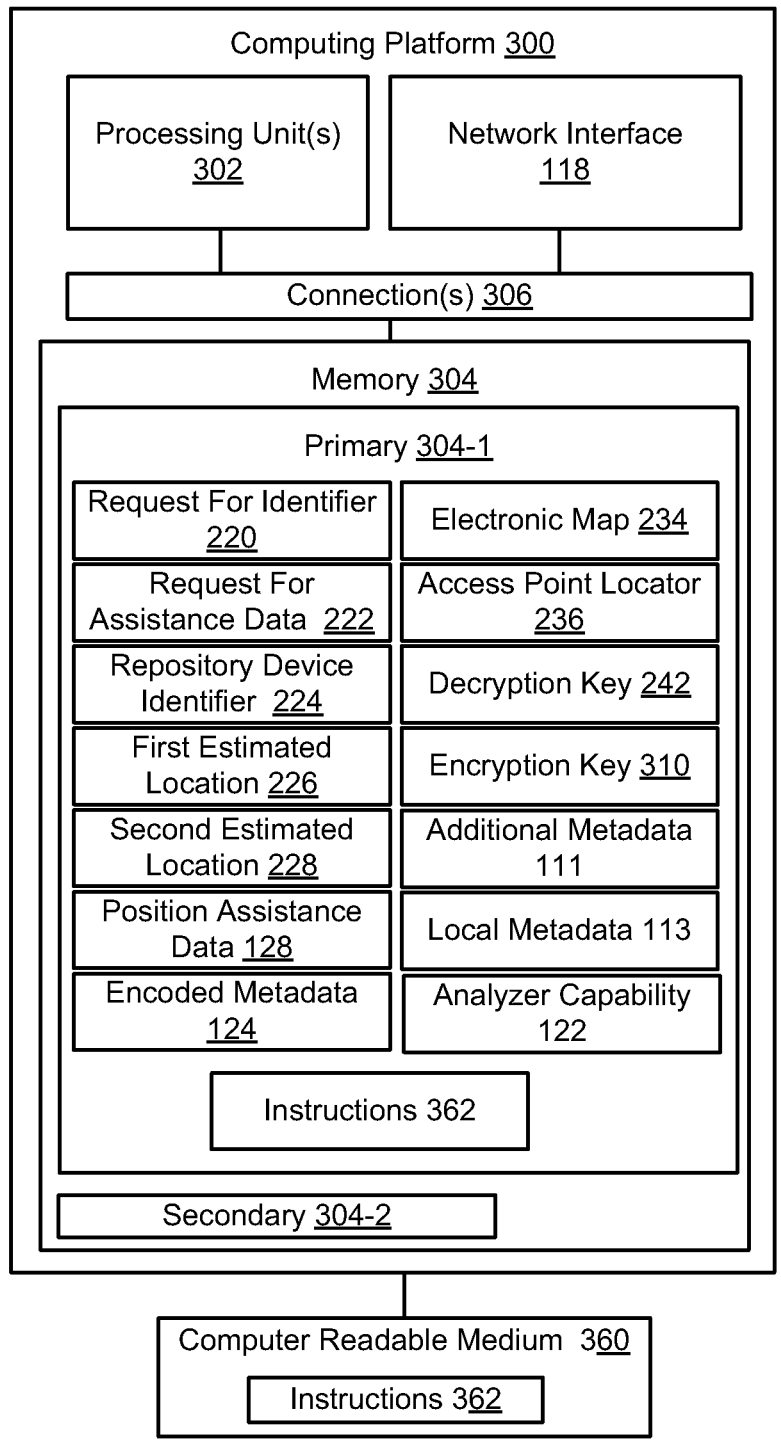
FIG. 3 is a schematic block diagram illustrating certain features of an example computing platform for use in one or more devices to establish and/or provide navigation assistance data and/or the like to a mobile station with regard to at least one of a plurality of different indoor regions, in accordance with an implementation.

FIG. 3 is a schematic block diagram illustrating certain features of an example computing platform 300 for use one or more devices that may be used to establish and/or provide navigation assistance data 128 and/or the like to mobile station 102, in accordance with an implementation. For example, directory device 106, repository device 108, or map inference device 140 may comprise one or more computing platforms 300.

As illustrated computing platform 300 may comprise one or more processing units 302 to perform data processing (e.g., in accordance with the techniques provided herein) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within computing platform 300. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 360. Memory 304 and/or computer readable medium 360 may comprise instructions 362 associated with data processing, e.g., in accordance with the techniques and/or apparatus 120 or apparatus 126 (FIG. 1), as provided herein.

Computing platform 300 may, for example, further comprise one or more network interfaces 118. A network interface 118 may, for example, provide connectivity to network(s) 104, mobile station 102, and/or other devices (FIG. 1), e.g., via one or more wired and/or wireless communication links.

Processing unit(s) 302 and/or instructions 362 may, for example, provide or otherwise be associated with one or more signals stored in memory 304, such as, one or more requests for a repository device identifier 220, one or more requests for assistance data 222, one or more repository device identifiers 224, a first estimated location 226, a second estimated location 228, navigation assistance data 128, encoded metadata 124, an analyzer capability 122, one or more electronic maps 234, one or more access point locators 236, one or more decryption keys 242, one or more encryption keys 310, additional metadata 111, local metadata 113, and/or the like or any combination thereof, e.g., as described in the various example techniques herein.

Figure 4:
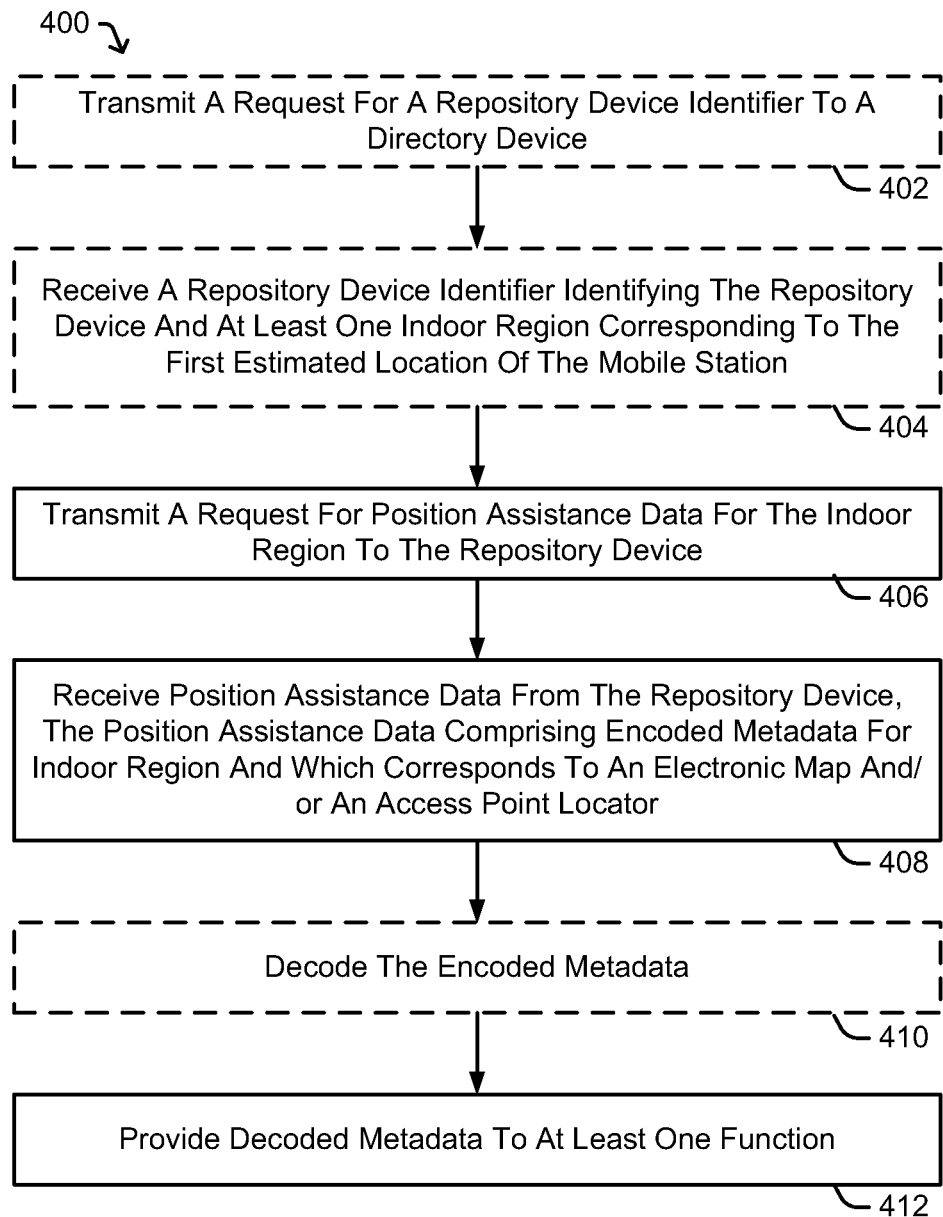
FIG. 4 is a flow diagram illustrating certain features of an example process or method for a mobile station to obtain and use navigation assistance data and/or the like with regard to at least one of a plurality of different indoor regions, in accordance with an implementation.

FIG. 4 is a flow diagram illustrating certain features of an example process or method 400 for a mobile station 102 to obtain and use navigation assistance data 128 and/or the like with regard to at least one of a plurality of different indoor regions, in accordance with an implementation. At example block 402, mobile station 102 may transmit a request for repository device identifier 220 to directory device 106. At block 404, mobile station 102 receive repository device identifier 224 identifying repository device 108 and at least one indoor region corresponding to first estimated location 226 of mobile station 102. At example block 406, mobile station 102 may transmit a request for navigation assistance data 222 for an indoor region to repository device 108. At example block 408, mobile station 102 may receive navigation assistance data 128 from repository device 108, wherein navigation assistance data 128 comprises encoded metadata 124 for the indoor region and which corresponds to electronic map 234 and/or access point locator 236. At example block 410, mobile station 102 may decode encoded metadata 124 (e.g., if/as needed). At example block 412, mobile station 102 may provide encoded metadata 124 (e.g., possibly in the form of decoded metadata 238) to or for use by at least one function 240.

Figure 5:
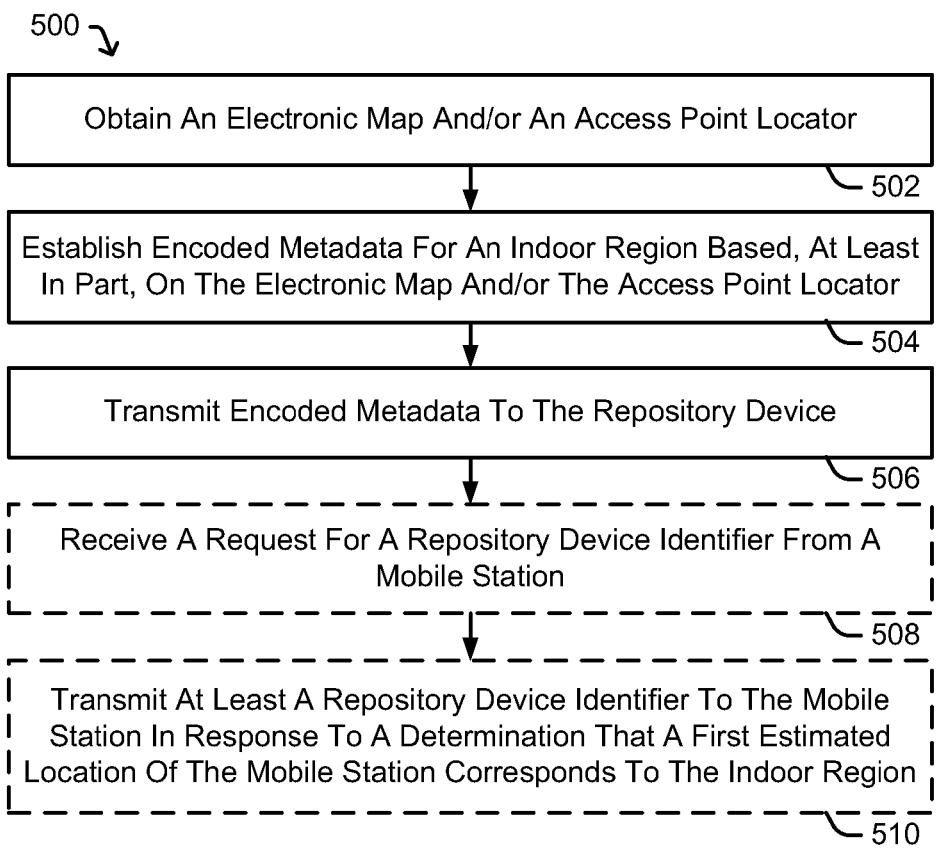
FIG. 5 is a flow diagram illustrating certain features of an example process or method for a computing platform at a directory device to establish and/or provide navigation assistance data and/or the like to a mobile station with regard to at least one of a plurality of different indoor regions, in accordance with an implementation.

FIG. 5 is a flow diagram illustrating certain features of an example process or method 500 for computing platform 300 at directory device 106 or, at least in part, at map inference device 140 to establish and/or provide navigation assistance data 128 and/or the like for use by mobile station 102 with regard to at least one of a plurality of different indoor regions, in accordance with an implementation. At example block 502, directory device 106 or map inference device 140 may obtain electronic map 234 and/or access point locator 236, e.g., from repository device 108 and/or the like. At example block 504, directory device 106 or map inference device 140 may establish encoded metadata 124 for an indoor region based, at least in part, on electronic map 234 and/or access point locator 236. At example block 506, directory device 106 or map inference device 140 may transmit encoded metadata 124 to repository device 108.

Additionally, at example block 508, directory device 106 may receive a request for a repository device identifier 220 from mobile station 102. At example block 510, directory device 106 may transmit at least a repository device identifier 224 to mobile station 102 in response to a determination that first estimated location 226 of mobile station 102 corresponds to a particular indoor region.

Figure 6:
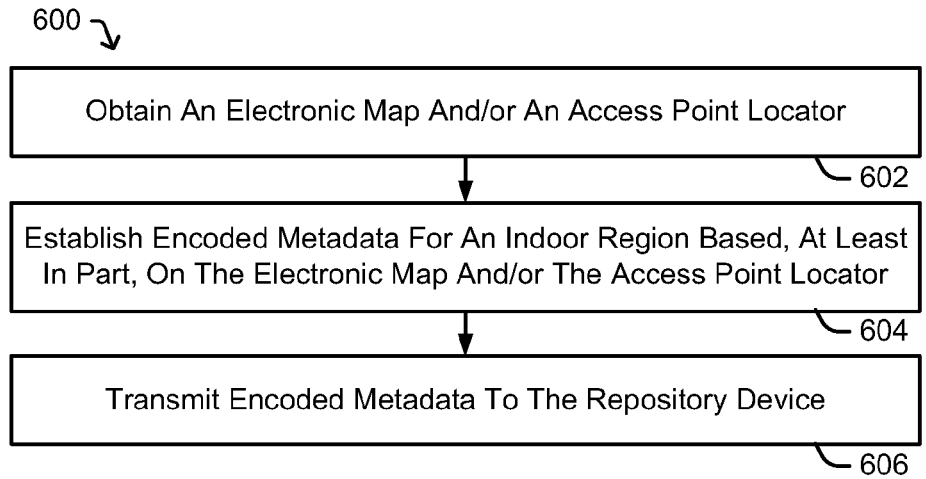
FIG. 6 is a flow diagram illustrating certain features of an example process or method for a computing platform at an inference device to establish and/or provide navigation assistance data and/or the like to a mobile station with regard to at least one of a plurality of different indoor regions, in accordance with an implementation.

FIG. 6 is a flow diagram illustrating certain features of an example process or method 600 for computing platform 300 at inference device 140 to establish and/or provide navigation assistance data 128 and/or the like for use by mobile station 102 with regard to at least one of a plurality of different indoor regions, in accordance with an implementation. At example block 602, map inference device 140 may obtain electronic map 234 and/or access point locator 236, e.g., from repository device 108 and/or the like. At example block 604, map inference device 140 may establish encoded metadata 124 for an indoor region based, at least in part, on electronic map 234 and/or access point locator 236. At example block 606, directory device 106 or map inference device 140 may transmit encoded metadata 124 to repository device 108.

Figure 7:
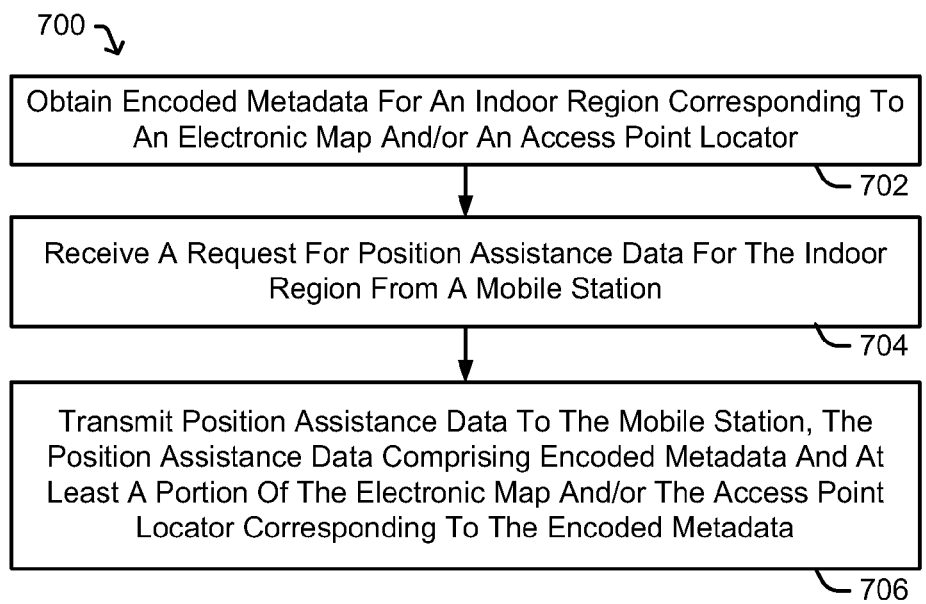
FIG. 7 is a flow diagram illustrating certain features of an example process or method for a computing platform at a repository device to establish and/or provide navigation assistance data and/or the like to a mobile station with regard to at least one of a plurality of different indoor regions, in accordance with an implementation.

FIG. 7 is a flow diagram illustrating certain features of an example process or method 700 for a computing platform 300 at repository device 108 to establish and/or provide navigation assistance data 128 data and/or the like to mobile station 102 with regard to at least one of a plurality of different indoor regions, in accordance with an implementation. At example block 702, repository device 108 may obtain encoded metadata 124 for an indoor region corresponding to electronic map 234 and/or access point locator 236. At example block 704, repository device 108 may receive a request for navigation assistance data 222 for the indoor region from mobile station 102. At example block 706, repository device 108 may transmit navigation assistance data 128 to mobile station 102, wherein navigation assistance data 128 comprises encoded metadata 124 and at least a portion of electronic map 234 and/or access point locator 236 corresponding to encoded metadata 124.

Figure 8:
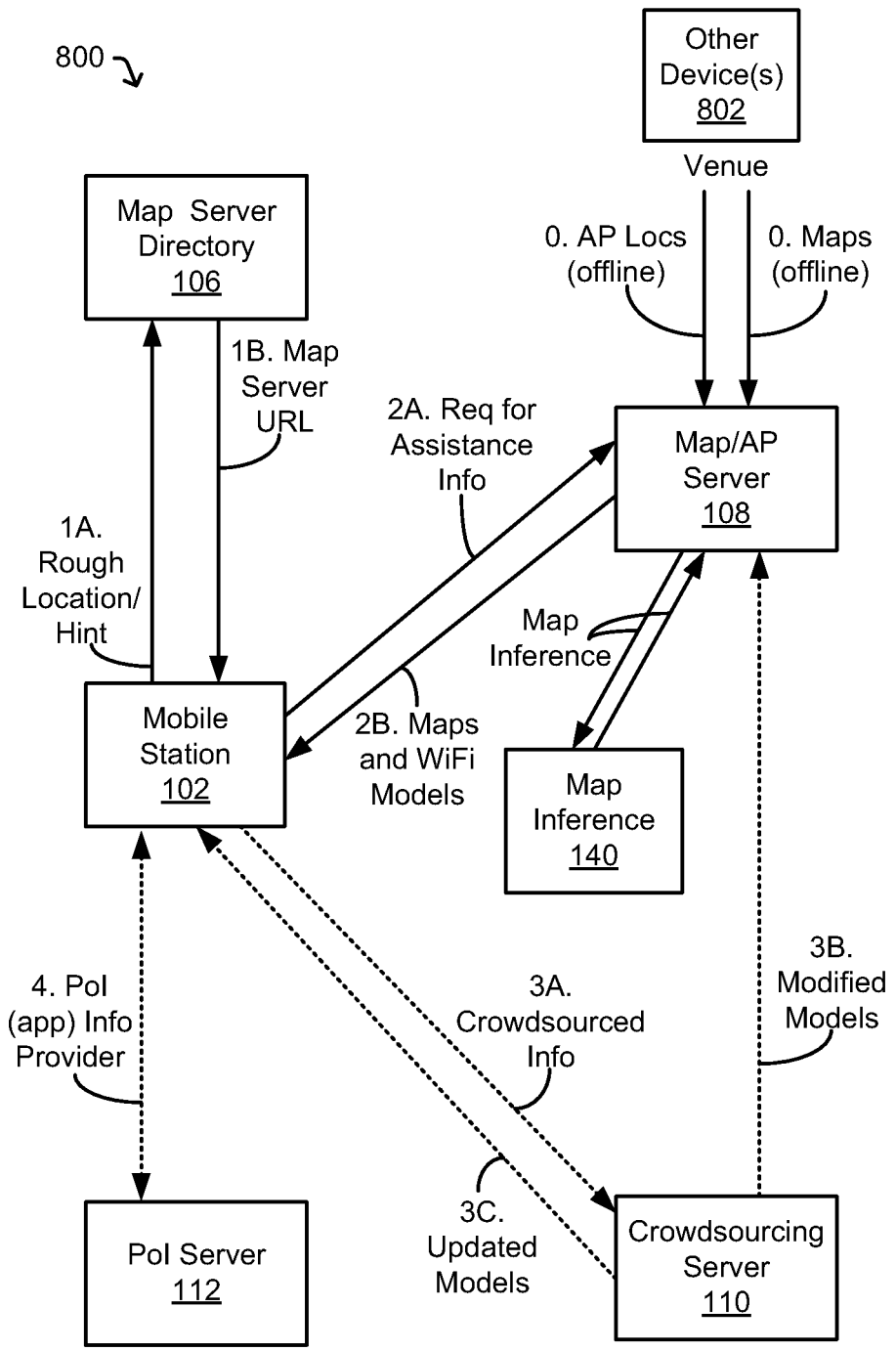
FIG. 8 is a schematic block diagram illustrating an example communication session that may be implemented in an example environment comprising a mobile station and several devices including a map inference device, in accordance with an implementation.

FIG. 8 is a schematic block diagram illustrating an example communication session 800 that may be implemented in an example environment to provide navigation assistance data and/or the like to mobile station 102, in accordance with an implementation. FIG. 8 is similar to FIG. 1, and also includes other devices 802, which may be associated with a venue having some knowledge with regard to one or more structures and/or regions. For example, a other devices 802 may comprise computing platforms 300 or the like connected to network(s) 104, which may generate or otherwise provide various forms of maps, diagrams, etc., and/or access point (AP) locations, radio heatmaps, etc., that may then be used, e.g., by repository device 108 or other like device, to establish electronic map 234 and/or access point locator 236 (e.g., see FIG. 2 and FIG. 3). Map inference device 140 may then, for example, obtain electronic map 234 and/or access point locator 236 for a particular region, e.g., from repository device 108 and/or the like, and establish corresponding encoded metadata 124, e.g., using an analyzer capability 122. Arrows with text are also shown in FIG. 8, which provide some examples of messages/information that may be communicated between the various devices, e.g., in accordance with example communication session 800.

As shown, example communication session 800 may include obtaining information from a venue, via one or more messages #0 between other devices 802 and repository device 108 (shown here as a "Map/AP Sever"). Repository device 108 may then establish one or more applicable electronic maps 234 and/or access point locators 236. Additionally, repository device 108 may deliver map/AP information to the Map Inference Device, and obtain encoded metadata 124 from map inference device 140. Hence, repository device 108 may obtain, store, or otherwise maintain navigation assistance data 128.

With one or more messages #1A, #1B between mobile station 102 and directory device 106 (shown here as a "Map Sever Directory"), mobile station 102 may use its rough location (e.g., first estimated location 226) to learn from the Map Server Directory which Map/AP server(s) to communicate with to request navigation assistance data 128. With one or more messages #2A, #2B between mobile station 102 and an applicable repository device 108 (Map/AP Server), mobile station 102 may use its rough location and/or other information from directory server 106 to query servers repository device 108.

With one or more messages #3A, #30 between mobile station 102 and a crowd-sourcing device 110 (shown here as a "Crowdsourcing Server"), mobile station may provide collected data 244 and/or receive additional metadata 111 (see FIG. 2). Here, for example, collected data may include crowdsourced information and/or measurements that may be gathered or otherwise collected by mobile station 102, e.g., via one or more circuits, applications, user interfaces, etc. Additional metadata 111 may, for example, comprise metadata similar to encoded data but which has been derived, updated or otherwise modified based, at least in part, on information obtained by or others generated within crowdsourcing device 110. For example, crowd-sourcing device 110 may make use of collected data from one or more mobile stations to update/correct existing AP locations, radio models, heatmaps, etc. As further shown, one or more messages #3B between crowd-sourcing device 110 and repository device 108 may be provided, e.g., for similar or other like purposes.

Further, in this example, one or more messages #4 between mobile station 102 and a local device 112 (shown here as a "POI Server") may be used to provide local metadata 113 and/or the like to mobile station 102, e.g., an indoor position of the mobile station may be used to trigger or otherwise obtain applicable POI information and services (e.g., location based services, etc.).

Figure 9:
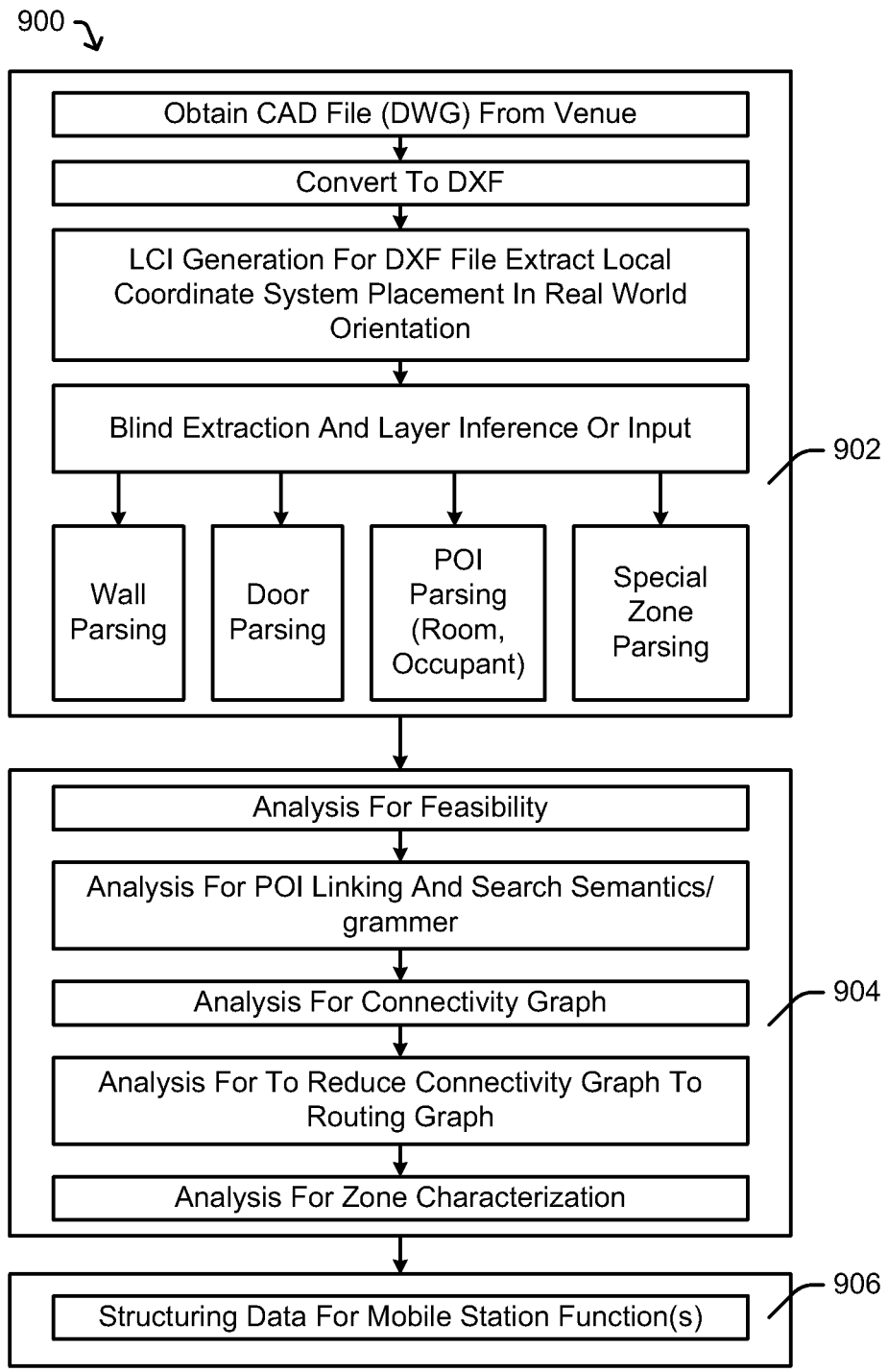
FIG. 9 is a flow diagram illustrating certain features of example processes or methods to establish an electronic map via a map extraction phase, establish encoded metadata via a map inference phase of an analyzer capability, and configure navigation assistance data for export to and/or use by a mobile station, in accordance with an implementation.

FIG. 9 is a flow diagram illustrating certain features of some example processes or methods 900 to establish an electronic map via a map extraction phase 902, establish encoded metadata via a map inference phase 904 (e.g., of an analyzer capability 122), and configure navigation assistance data 128 for export to and/or use by mobile station 102 via a map export phase 906, in accordance with an implementation.

Structure and/or region diagrams are often owned, controlled, or otherwise maintained by some entity or person associated with a particular venue. Some structure and/or region diagrams that may be provided for a venue may include embedded information about certain features and/or objects within a region. By way of example, some diagrams may provide a level of accuracy and detail that may be available in CAD diagrams or the like. Thus, assuming that the diagrams (maps) are available in an appropriate CAD format (e.g., drawing exchange format (DXF), etc.), they may be processed by repository device 108, as needed, into a suitable electronic format. In certain example implementations, some maps may be expressed in an Extensible Markup Language (XML), or other like language (e.g., GML, or KML, or CityGML, etc.) for ease of use, and possibly to ensure commonality across multiple devices.

Repository device 108, as a Map Server may, for example, host one or more maps of one or more LCIs, regions, structures, venues, etc. Repository device 108 may, for example, aggregate maps of many different LCIs. Hence, a scale and possibly ownership of such a Map Server may vary significantly. On one hand, a single entity (e.g., associated with an office building, or a mall) may host a repository device 108. In other examples, an entire campus or enterprise may host all their various maps on a single repository device 108. In still other example implementations, a third party may provide for a central repository device 108 for a wide number of venues. It should be noted that the various techniques provided herein may be implemented in various manners, including architectures that may be essentially agnostic to a scale of a map server.

Map extraction phase 902 may, for example, be performed at repository device 108, and/or other like devices. In example map extraction phase 902, a CAD file may be analyzed to determine the relevant information present in its many layers. The necessary pieces of information extracted may include, for example, walls, doors and entry/exit points. This analysis may also identify special zones like portals (e.g., elevators, escalators, stairs). Also, some POI information (e.g. Restroom) available in the CAD files may be extracted. Such extraction techniques and others are known and beyond the scope of this description. Moreover, subject matter claimed herein is not necessarily limited to any particular extraction techniques.

Map inference phase 904 may, for example, be performed in whole or in part one or more of directory device 106, repository device 108, map inference device 140, and/or other like devices. With map inference phase 904, certain features of a map may be analyzed, e.g., by a suite of algorithms, to determine useful metadata of the map. For example, as part of map inference phase 904, analysis may be performed as to a user's movement/access feasibility and/or infeasibility with respect to various parts of a map (e.g., and objects in a region represented thereby). In certain example instances, a dense connectivity graph may be determined, e.g., that may be utilized by a positioning function for accurate positioning, etc. In certain example instances, a connectivity graph may be determined and/or possibly reduced to form a routing graph, for use in navigation functions, and/or for other like purposes. In certain example instances, a probability map of a region maybe determined, e.g., based on routes, etc. In certain example instances, radio heatmaps or other like RF signal related information associated with a region may be determined, e.g., through map analysis and availability of known transmitter locations. In certain example instances, various points of interest may be linked or otherwise identified, e.g., based on determined relationships, etc.

In certain example implementations, it may be beneficial to have both map information and access point or other transmitter information available in map inference phase 904. Various like map inference techniques and others are known and beyond the scope of this description. Moreover, subject matter claimed herein is not necessarily limited to any particular map inference techniques.

In certain example implementations, an access point locator may include radio models, radio heatmaps, and/or other like RF signal related information associated with a region. In certain instances, it may be beneficial not include exact AP or transmitter locations in an access point locator. Radio heatmaps (e.g. RSSI heatmaps) may, for example, be expressed as signal strengths at various points in a region. Thus, exact AP/transmitter locations may not need to be relayed to mobile stations in certain implementations, e.g., particularly once encoded metadata has been established.

In certain example implementations, a first estimated location may be provided, at least in part, using a last known GPS fix, identifying WiFi access points being heard, or possibly via some text input from user or other sensed information (e.g., camera, scanner, microphone) that may possibly indicate or hint at a rough current location.

In certain example implementations, a directory device 106 may provide some assistance data to a mobile station, e.g., by determining one or more nearby LCI(s), e.g., by looking such up in a database, etc.

In certain example implementations, map export phase 906 may establish encoded metadata 128 in XML-like formats, and/or the like. In certain instances, all or part of map export phase 906 may be performed at a directory device 106 and may take advantage of various forms of specific encoding, data compression, and/or data encryption techniques. In certain other example instances, all or part of map export phase 906 may be performed at a repository device 108, and/or the like. In still other instances, all or part of map export phase 906 may be performed along with similar actions regarding other data that may be included in navigation assistance data 128. Various data exportation, processing, conversion, techniques and others are known and beyond the scope of this description. Moreover, subject matter claimed herein is not necessarily limited to any particular data formatting techniques.

Figure 10:
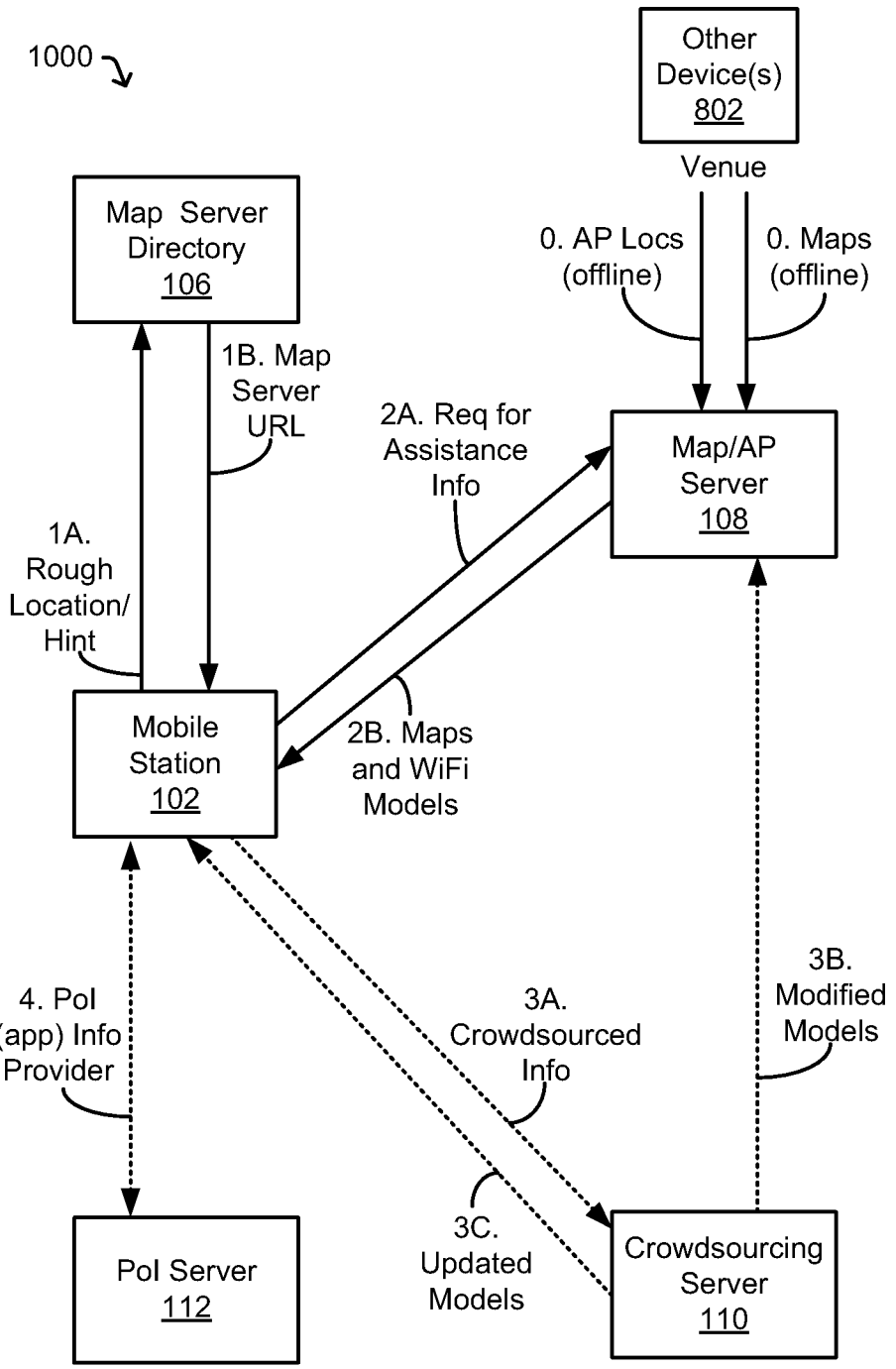
FIG. 10 is a schematic block diagram illustrating an example communication session that may be implemented in another example environment comprising a mobile station and several devices, in accordance with an implementation.

FIG. 10 is a schematic block diagram illustrating an example communication session 1000 that may be implemented in an example environment to provide navigation assistance data and/or the like to mobile station 102, in accordance with yet another implementation. FIG. 10 is similar to FIG. 8, but does not comprise or use of a map inference device 140. Instead, in this example, an apparatus 120 may be provided at Map/AP server 108 with an analyzer capability to establish encoded metadata 124, e.g., using example techniques as provided herein.

Figure 11:
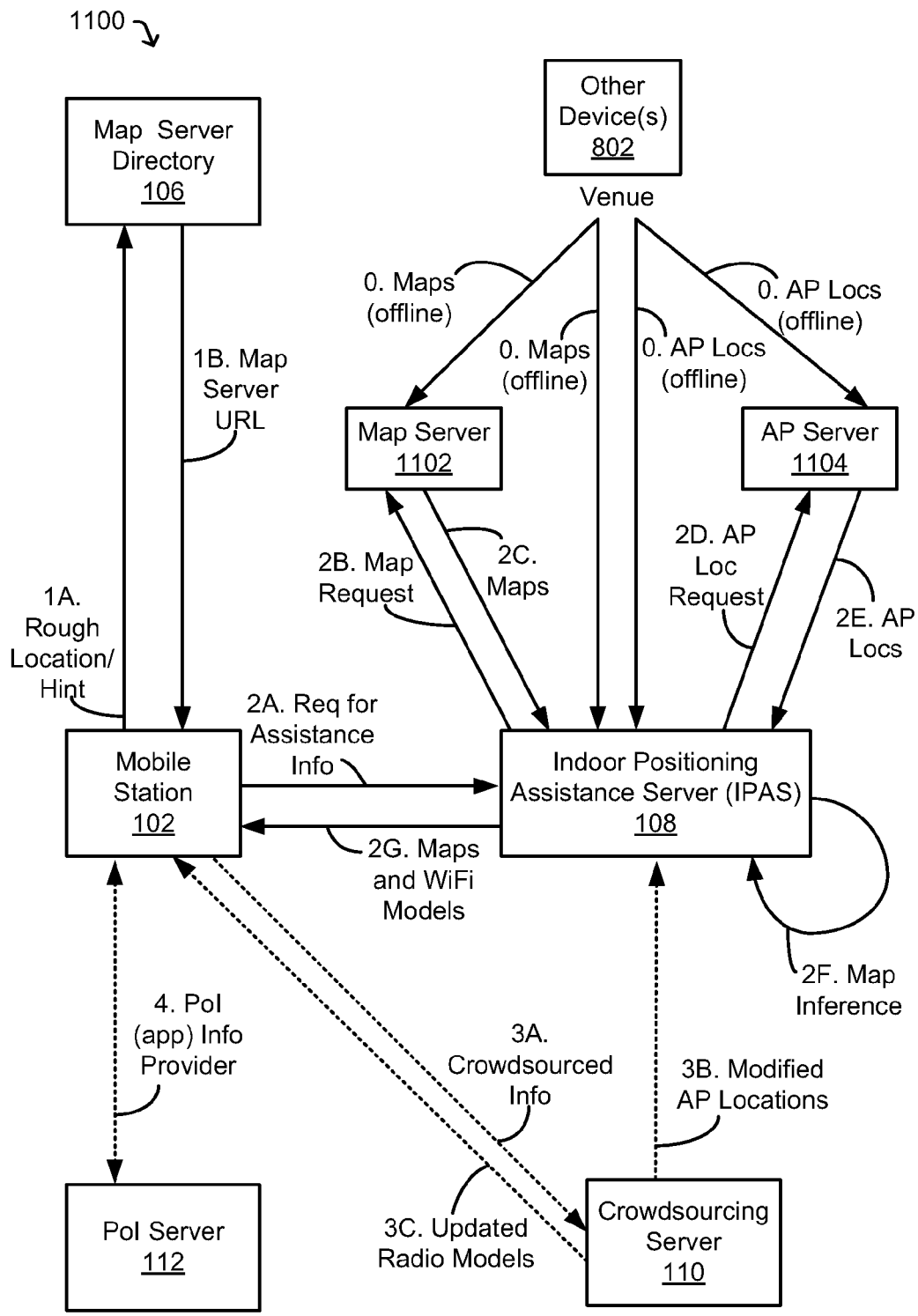
FIG. 11 is a schematic block diagram illustrating an example communication session that may be implemented in yet another example environment comprising a mobile station and several devices, in accordance with an implementation.

FIG. 11 is a schematic block diagram illustrating an example communication session 1100 that may be implemented in an example environment to provide navigation assistance data and/or the like to mobile station 102, in accordance with yet another implementation. FIG. 11 is similar to FIG. 10, and also includes a map server 1102 and an AP server 1104, separated out from repository device 108, which is shown here as "Indoor Positioning Assistance Server (IPAS)". Map server 1102 and AP server 1104 may, for example, communicate offline with other devices 802 as indicated. Also, different from FIG. 10, in this implementation, as indicated by circular arrow at repository device 108 (message #2F) repository device 108 may comprise an analyzer capability that performs map inference. As such, in certain example instances, all or some map inference may be performed on-the-fly.

With this in mind, as shown via messages #0, a venue may provide maps and AP information which may be pre-processed and kept at map server 1102 and AP server 1104, respectively. Alternatively, a venue may provide certain map and/or AP information directly to repository device 108. As illustrated via messages #1A, #1B, mobile station 102 may communicate with a directory device, e.g., shown here as an Indoor Positioning Assistance Server Directory (IPAS-D), again using a rough location to allow the IPAS-D to determine an applicable IPAS for the mobile station to communicate with. Thus, via messages #2A-#2G, mobile station 102 may obtain navigation assistance data 128 from repository device 108. Here, for example, if the IPAS has a cached version of applicable electronic map 234 and access point locator 236, then repository device 108 may respond directly to mobile station 102 with navigation assistance data 128 (including encoded metadata 124). However, if the IPAS does not have a cached version of applicable electronic map 234 and access point locator 236, then repository device 108 may further communicate with map server 1102 and AP server 1104 to obtain such information.

With one or more messages #3A, #3O between mobile station 102 and a crowd-sourcing device 110 (shown here as a "Crowdsourcing Server"), mobile station may provide collected data 244 and/or receive additional metadata 111 (see FIG. 2). Additional metadata 111 may, for example, comprise metadata similar to encoded data but which has been derived, updated or otherwise modified based, at least in part, on information obtained by or others generated within crowd-sourcing device 110. As further shown, one or more messages #3B between crowd-sourcing device 110 and repository device 108 may be provided, e.g., for similar or other like purposes. Further, in this example, one or more messages #4 between mobile station 102 and a local device 112 (shown here as a "POI Server") may be used to provide local metadata 113 and/or the like to mobile station 102, e.g., an indoor position of the mobile station may be used to trigger or otherwise obtain applicable POI information and services (e.g., location based services, etc.).

Figure 12:
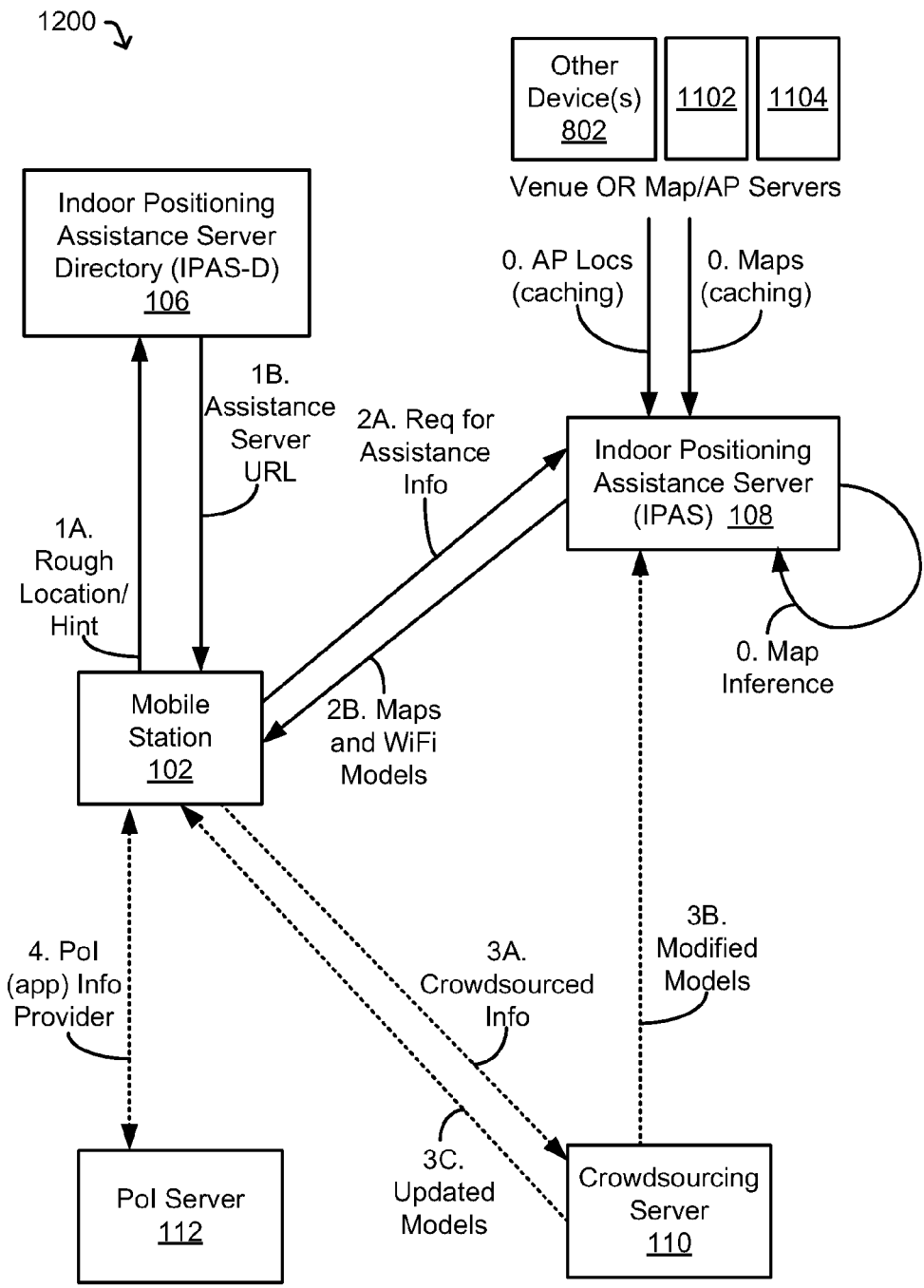
FIG. 12 is a schematic block diagram illustrating an example communication session that may be implemented in still another example environment comprising a mobile station and several devices, in accordance with an implementation.

FIG. 12 is a schematic block diagram illustrating an example communication session 1200 that may be implemented in an example environment to provide navigation assistance data and/or the like to mobile station 102, in accordance with yet another implementation. FIG. 12 is similar to FIG. 10 and FIG. 10, and as indicated by circular arrow at repository device 108 (a message #0), repository device 108 may comprise an analyzer capability that performs map inference (e.g., in advance of a request). Here, however, unlike FIG. 10 and more like FIG. 10, maps and AP location information may be obtained via messages #0 (and cached) at the IPAS from other devices 802.

It should be noted that additional example implementations may be provided and that claimed subject matter is not necessarily limited to the illustrated and described implementation. For example, in certain other implementations, various capabilities as described herein may be operatively combined in whole or in part using one or more computing platforms at certain devices. For example, a device may comprise a hybrid mixture of capabilities which may be provided for using a directory device 106, a repository device 108, a map inference device 140, other devices 802, a map server 1002, an AP server 1004, a crowd-sourcing device 110, a local device 112, and/or the like. By way of example, as illustrated in certain example implementations herein, an analyzer capability 122 which may establish encoded metadata 124 may be provided at one or more different devices.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a computing platform of a map inference device:

obtaining, from a repository device, said repository device being indicated by a repository device identifier, for at least a portion of at least one indoor region, an electronic map or an access point locator, or any combination thereof;

establishing encoded metadata for said portion of at least one indoor region based, at least in part, on said electronic map or said access point locator, or any combination thereof; and transmitting said encoded metadata to said repository device, said repository device to provide at least a portion of said encoded metadata to a mobile station in response to a request for navigation assistance data received at the repository device from said mobile station, wherein at least a portion of said encoded metadata is for use in said mobile station in a positioning function, a navigation function or a location based service function, or any combination thereof.

2. The method as recited in claim 1, and further comprising, at said map inference device:

encrypting said encoded metadata using an encryption key; and transmitting a decryption key corresponding to said encryption key to said mobile station.

3. The method as recited in claim 1, wherein at least a portion of said encoded metadata is established, at least in part, in response to a request received from said repository device.

4. An apparatus for use at a map inference device, the apparatus comprising:
   means for obtaining, from a repository device, said repository device being indicated by a repository device identifier, for at least a portion of at least one indoor region, an electronic map or an access point locator, or any combination thereof;
   means for establishing encoded metadata for at least said portion of said at least one indoor region based, at least in part, on said electronic map or said access point locator, or any combination thereof; and
   means for transmitting said encoded metadata to said repository device, said repository device to provide at least a portion of said encoded metadata to a mobile station in response to a request for navigation assistance data received at the repository device from said mobile station,
   wherein said means for establishing encoded metadata establishes said encoded metadata for use by said mobile station in a positioning function, a navigation function or a location based service function, or any combination thereof.

5. The apparatus as recited in claim 4, and further comprising, at said map inference device:
   means for encrypting said encoded metadata using an encryption key; and
   means for transmitting a decryption key corresponding to said encryption key to said mobile station.

6. The apparatus as recited in claim 4, wherein said means for establishing encoded metadata establishes at least a portion of said encoded metadata in response to a request received from said repository device.

7. A computing platform for use at a map inference device, the computing platform comprising:
   a network interface; and
   a processing unit to:
      obtain via said network interface, from a repository device, said repository device being indicated by a repository device identifier, for at least a portion of at least one indoor region, an electronic map or an access point locator, or any combination thereof;
      establish encoded metadata for at least said portion of said at least one indoor region based, at least in part, on said electronic map or said access point locator, or any combination thereof; and
      initiate transmission of said encoded metadata to said repository device, said repository device to provide at least a portion of said encoded metadata to a mobile station in response to a request for navigation assistance data received at the repository device from said mobile station,
      wherein at least a portion of said encoded metadata is for use in said mobile station in a positioning function, a navigation function or a location based service function, or any combination thereof.

8. The computing platform as recited in claim 7, said processing unit to further:
   encrypt said encoded metadata using an encryption key; and
   initiate transmission of a decryption key corresponding to said encryption key to said mobile station.

9. The computing platform as recited in claim 7, said processing unit to establish said encoded metadata in response to a request received from said repository device via said network interface.

10. An article comprising:
   a non-transitory computer readable medium having stored therein computer implementable instructions that are executable by a processing unit in a map inference device to:
      obtain, from a repository device, said repository device being indicated by a repository device identifier, for at least a portion of at least one indoor region, an electronic map or an access point locator, or any combination thereof;
      establish encoded metadata for at least said portion of said at least one indoor region based, at least in part, on said electronic map or said access point locator, or any combination thereof; and
      initiate transmission of said encoded metadata to said repository device, said repository device to provide at least a portion of said encoded metadata to a mobile station in response to a request for navigation assistance data received at the repository device from said mobile station,
      wherein at least a portion of said encoded metadata is for use in said mobile station in a positioning function, a navigation function or a location based service function, or any combination thereof.

11. The article as recited in claim 10, said computer implementable instructions being further executable by said processing unit to:
   encrypt said encoded metadata using an encryption key; and
   initiate transmission of a decryption key corresponding to said encryption key to said mobile station.

12. The article as recited in claim 10, said computer implementable instructions being further executable by said processing unit to:
   establish said encoded metadata in response to a request received from said repository device.

13. A method comprising, at a directory device:
   obtaining, for at least a portion of at least one indoor region, an electronic map or an access point locator, or any combination thereof;
   establishing encoded metadata for at least said portion of at least one indoor region based, at least in part, on said electronic map or said access point locator, or any combination thereof;
   transmitting said encoded metadata to a repository device;
   receiving a request for a repository device identifier from a mobile station, said request for said repository device identifier being indicative of at least a first estimated location of said mobile station; and
   in response to determining that said first estimated location of said mobile station corresponds to said at least said portion of at least one indoor region, transmitting a repository device identifier for said repository device to said mobile station,
   wherein at least a portion of said encoded metadata is for use in said mobile station in a positioning function, a navigation function or a location based service function, or any combination thereof.

14. The method as recited in claim 13, and further comprising, at said directory device:
   in response to determining that said first estimated location of said mobile station corresponds to said at least said portion of at least one indoor region, further transmitting, to said mobile station, at least one identifier for said electronic map, said access point locator or said encoded metadata, or any combination thereof.

15. The method as recited in claim 13, and further comprising, at said directory device:
encrypting said encoded metadata using an encryption key; and
transmitting a decryption key corresponding to said encryption key to said mobile station.

16. The method as recited in claim 13, and further comprising, at said directory device:
obtaining additional metadata for said portion of at least one indoor region from a crowd-sourcing device; and
wherein establishing said encoded metadata further comprises establishing said encoded metadata based, at least in part, on at least a portion of said additional metadata.

17. The method as recited in claim 13, wherein at least a portion of said encoded metadata is established, at least in part, prior to receiving said request for said repository device identifier from said mobile station.

18. The method as recited in claim 13, wherein at least a portion of said encoded metadata is established, at least in part, in response to said request for said repository device identifier from said mobile station or a request received from said repository device, or any combination thereof.

19. An apparatus for use in a directory device, the apparatus comprising:
means for obtaining, for at least a portion of at least one indoor region,
an electronic map or an access point locator, or any combination thereof;
means for establishing encoded metadata for at least said portion of at least one indoor region based, at least in part, on said electronic map or said access point locator, or any combination thereof;
means for transmitting said encoded metadata to a repository device;
means for receiving a request for a repository device identifier from a mobile station, said request for said repository device identifier being indicative of at least a first estimated location of said mobile station; and
means for transmitting a repository device identifier for said repository device to said mobile station, in response to a determination that said first estimated location of said mobile station corresponds to said portion of at least one indoor region,
wherein at least a portion of said encoded metadata is for use in said mobile station in a positioning function, a navigation function or a location based service function, or any combination thereof.

20. The apparatus as recited in claim 19, and further comprising:
means for transmitting, to said mobile station, at least one identifier for said electronic map, said access point locator or said encoded metadata, or any combination thereof, in response to a determination that said first estimated location of said mobile station corresponds to said portion of at least one indoor region.

21. The apparatus as recited in claim 19, and further comprising:
means for encrypting said encoded metadata using an encryption key; and
means for transmitting a decryption key corresponding to said encryption key to said mobile station.

22. The apparatus as recited in claim 19, and further comprising:
means for obtaining additional metadata for said portion of at least one indoor region from a crowd-sourcing device; and
means for establishing said encoded metadata based further, at least in part, on at least a portion of said additional metadata.

23. The apparatus as recited in claim 19, wherein said means for establishing said encoded metadata establishes said encoded metadata prior to said request for said repository device identifier being received from said mobile station.

24. The apparatus as recited in claim 19, wherein said means for establishing said encoded metadata establishes said encoded metadata, at least in part, in response to receiving said request for said repository device identifier from said mobile station or a request received from said repository device, or any combination thereof.

25. A computing platform at a directory device comprising:
a network interface; and
a processing unit to:
obtain via said network interface, for at least a portion of at least one indoor region, an electronic map or an access point locator, or any combination thereof;
establish encoded metadata for at least said portion of at least one indoor region based, at least in part, on said electronic map or said access point locator, or any combination thereof;
initiate transmission of said encoded metadata to a repository device via said network interface;
obtain a request for a repository device identifier from a mobile station via said network interface, said request for said repository device identifier being indicative of at least a first estimated location of said mobile station; and
in response to a determination that said first estimated location of said mobile station corresponds to said portion of at least one indoor region, initiate transmission of a repository device identifier for said repository device to said mobile station via said network interface,
wherein at least a portion of said encoded metadata is for use in said mobile station in a positioning function, a navigation function or a location based service function, or any combination thereof.

26. The computing platform as recited in claim 25, said processing unit to further:
in response said determination that said first estimated location of said mobile station corresponds to said portion of at least one indoor region, initiate transmission, to said mobile station via said network interface, of at least one identifier for said electronic map, said access point locator or said encoded metadata, or any combination thereof.

27. The computing platform as recited in claim 25, said processing unit to further:
encrypt said encoded metadata using an encryption key; and
initiate transmission of a decryption key corresponding to said encryption key to said mobile station via said network interface.

28. The computing platform as recited in claim 25, said processing unit to further:
obtain additional metadata for said portion of at least one indoor region from a crowd-sourcing device via said network interface; and
establish said encoded metadata based further, at least in part, on at least a portion of said additional metadata.

29. The computing platform as recited in claim 25, said processing unit to further establish said encoded metadata prior said request for said repository device identifier being received from said mobile station.

30. The computing platform as recited in claim 25, said processing unit to further establish said encoded metadata, at least in part, in response to receiving said request for said repository device identifier from said mobile station or a request from said repository device via said network interface, or any combination thereof.

31. An article comprising:
a non-transitory computer readable medium having stored therein computer implementable instructions that are executable by a processing unit in a directory device to:
obtain, for at least a portion of at least one indoor region, an electronic map or an access point locator, or any combination thereof;
establish encoded metadata for at least said portion of at least one indoor region based, at least in part, on said electronic map or said access point locator, or any combination thereof;
initiate transmission of said encoded metadata to a repository device;
obtain a request for a repository device identifier from a mobile station, said request for said repository device identifier being indicative of at least a first estimated location of said mobile station; and
initiate transmission of a repository device identifier for said repository device to said mobile station, in response to a determination that said first estimated location of said mobile station corresponds to said portion of at least one indoor region,
wherein at least a portion of said encoded metadata is for use in said mobile station in a positioning function, a navigation function or a location based service function, or any combination thereof.

32. The article as recited in claim 31, said computer implementable instructions being further executable by said processing unit to:
initiate transmission of, to said mobile station, at least one identifier for said electronic map, said access point locator or said encoded metadata, or any combination thereof, in response to said determination that said first estimated location of said mobile station corresponds to said portion of said at least one indoor region.

33. The article as recited in claim 31, said computer implementable instructions being further executable by said processing unit to:
encrypt said encoded metadata using an encryption key; and
initiate transmission of a decryption key corresponding to said encryption key to said mobile station.

34. The article as recited in claim 31, said computer implementable instructions being further executable by said processing unit to:
obtain additional metadata for said portion of at least one indoor region from a crowd-sourcing device; and
establishing said encoded metadata based further, at least in part, on at least a portion of said additional metadata.

35. The article as recited in claim 31, said computer implementable instructions being further executable by said processing unit to:
establish said encoded metadata prior to obtaining said request for said repository device identifier from said mobile station.

36. The article as recited in claim 31, said computer implementable instructions being further executable by said processing unit to:
establish at least a portion of said encoded metadata in response to said request for said repository device identifier from said mobile station or a request received from said repository device, or any combination thereof.

37. A method comprising, at a repository device:
obtaining encoded metadata for at least a portion of at least one indoor region corresponding to an electronic map or an access point locator, or any combination thereof, wherein at least a portion of said encoded metadata is obtained from a directory device;
receiving a request for navigation assistance data for at least one indoor region from a mobile station; and
transmitting at least a portion of said navigation assistance data to said mobile station, said navigation assistance data comprising, at least in part, said encoded metadata and a portion of said electronic map or said access point locator corresponding to said encoded metadata, or any combination thereof,
wherein at least a portion of said encoded metadata is for use in said mobile station in a positioning function, a navigation function or a location based service function, or any combination thereof.

38. The method as recited in claim 37, wherein obtaining said encoded metadata further comprises, at said repository device:
establishing at least a portion of said encoded metadata for at least said portion of said at least one indoor region based, at least in part, on said electronic map or said access point locator, or any combination thereof.

39. The method as recited in claim 38, and further comprising, at said repository device:
obtaining additional metadata for said at least one indoor region from a crowd-sourcing device; and
wherein establishing said at least said portion of said encoded metadata further comprises establishing said at least said portion of said encoded metadata based, at least in part, on at least a portion of said additional metadata.

40. The method as recited in claim 37, wherein at least a portion of said encoded metadata has been encrypted by said directory device.

41. The method as recited in claim 37, wherein at least a portion of said encoded metadata is established, at least in part, prior to receiving said request for navigation assistance data.

42. The method as recited in claim 37, wherein at least a portion of said encoded metadata is established, at least in part, in response to said request for navigation assistance data.

43. The method as recited in claim 37, and further comprising, at said repository device:
establishing said electronic map or said access point locator, or any combination thereof, based, at least in part, on at least one venue diagram for said at least one indoor region.

44. An apparatus for use in a repository device, the apparatus comprising:
means for obtaining encoded metadata for at least a portion of at least one indoor region corresponding to at least one of an electronic map or an access point locator, wherein at least a portion of said encoded metadata is obtained from a directory device;
means for receiving a request for navigation assistance data for at least one indoor region from a mobile station; and means for transmitting at least a portion of said navigation assistance data to said mobile station, said navigation assistance data comprising, at least in part, said encoded metadata and at least a portion of said electronic map or said access point locator corresponding to said encoded metadata, or any combination thereof, wherein at least a portion of said encoded metadata is for use in said mobile station in at a positioning function, a navigation function or a location based service function, or any combination thereof.

45. The apparatus as recited in claim 44, wherein said means for obtaining said encoded metadata further comprises:

means for establishing at least a portion of said encoded metadata for at least said portion of said at least one indoor region based, at least in part, on said electronic map or said access point locator, or any combination thereof.

46. The apparatus as recited in claim 45, and further comprising:

means for obtaining additional metadata for said at least one indoor region from a crowd-sourcing device; and wherein said means for establishing said at least said portion of said encoded metadata further comprises: means for establishing said at least said portion of said encoded metadata based, at least in part, on at least a portion of said additional metadata.

47. The apparatus as recited in claim 44, and further comprising:

means for establishing said electronic map or said access point locator, or any combination thereof, based, at least in part, on at least one venue diagram for said at least one indoor region.

48. A computing platform at a repository device, comprising:

a network interface; and a processing unit to:

obtain encoded metadata for at least a portion of at least one indoor region corresponding to at least one of an electronic map or an access point locator, wherein at least a portion of said encoded metadata is obtained from a directory device;

obtain a request for navigation assistance data for at least one indoor region from a mobile station via said network interface; and initiate transmission of at least a portion of said navigation assistance data to said mobile station via said network interface, said navigation assistance data comprising, at least in part, said encoded metadata and said electronic map or said access point locator corresponding to said encoded metadata, or any combination thereof, wherein at least a portion of said encoded metadata is for use in said mobile station in a positioning function, a navigation function or a location based service function, or any combination thereof.

49. The computing platform as recited in claim 48, said processing unit to further:

establish at least a portion of said encoded metadata for at least said portion of said at least one indoor region based, at least in part, on said electronic map or said access point locator, or any combination thereof.

50. The computing platform as recited in claim 49, said processing unit to further:

obtain additional metadata for said at least one indoor region from a crowd-sourcing device via said network interface; and establish said at least said portion of said encoded metadata based further, at least in part, on at least a portion of said additional metadata.

51. The computing platform as recited in claim 49, said processing unit to further:

establish at least said portion of said encoded, at least in part, in response to said request for navigation assistance data.

52. The computing platform as recited in claim 49, said processing unit to further:

establish said electronic map or said access point locator, or any combination thereof, based, at least in part, on at least one venue diagram for said at least one indoor region.

53. An article comprising:

a non-transitory computer readable medium having stored therein computer implementable instructions that are executable by a processing unit in a repository device to:

obtain encoded metadata for at least a portion of at least one indoor region corresponding to at least one of an electronic map or an access point locator, wherein at least a portion of said encoded metadata is obtained from a directory device;

obtain a request for navigation assistance data for at least one indoor region from a mobile station; and initiate transmission of at least a portion of said navigation assistance data to said mobile station, said navigation assistance data comprising, at least in part, said encoded metadata and at least a portion of said electronic map or said access point locator corresponding to said encoded metadata, or any combination thereof, wherein at least a portion of said encoded metadata is for use in said mobile station in a positioning function, a navigation function or a location based service function, or any combination thereof.

54. The article as recited in claim 53, said computer implementable instructions being further executable by said processing unit to:

establish at least a portion of said encoded metadata for at least said portion of said at least one indoor region based, at least in part, on said electronic map or said access point locator, or any combination thereof.

55. The article as recited in claim 54, said computer implementable instructions being further executable by said processing unit to:

obtain additional metadata for said at least one indoor region from a crowd-sourcing device; and establish said at least said portion of said encoded metadata based further, at least in part, on at least a portion of said additional metadata.

56. The article as recited in claim 54, said computer implementable instructions being further executable by said processing unit to:

establish at least said portion of said encoded metadata, at least in part, in response to said request for navigation assistance data.

57. The article as recited in claim 54, said computer implementable instructions being further executable by said processing unit to:

establish said electronic map or said access point locator, or any combination thereof, based, at least in part, on at least one venue diagram for said at least one indoor region.

58. The method as recited in claim 1, wherein said at least a portion of at least one indoor region comprises indoor features including doors, hallways, entry ways, walls or any combination thereof, and points of interest, and wherein the at least a portion of the encoded metadata enables the mobile station overlay a current location of the mobile station in a displayed map.

59. The method as recited in claim 1, wherein said encoded metadata is determined based, at least in part, on a request for a repository device identifier transmitted from said mobile station to a directory device, said request for a repository device identifier being indicative of a location estimate of said mobile station, the method further comprising receiving said repository device identifier from said directory device.

60. The method as recited in claim 13, wherein said at least a portion of at least one indoor region comprises indoor features including doors, hallways, entry ways, walls or any combination thereof, and points of interest, and wherein the at least a portion of the encoded metadata enables the mobile station to overlay a current location of the mobile station in a displayed map.

61. The method as recited in claim 13 wherein the obtaining of the at least one of the electronic map or the access point locator includes obtaining the at least one of the electronic map or the access point locator from a map inference device.

62. The apparatus as recited in claim 19 wherein the means for obtaining the at least one of the electronic map or the access point locator includes means for obtaining the at least one of the electronic map or the access point locator from a map inference device.

63. The computing platform as recited in claim 25 wherein the processing unit is further to obtain the at least one of the electronic map or the access point locator from a map inference device.

64. The article as recited in claim 31 wherein said computer implementable instructions are further executable by said processing unit to obtain the at least one of the electronic map or the access point locator from a map inference device.

65. The method as recited in claim 37, wherein said at least a portion of at least one indoor region comprises indoor features including doors, hallways, entry ways, walls or any combination thereof, and points of interest, and wherein the at least a portion of the encoded metadata enables the mobile station to overlay a current location of the mobile station in a displayed map.

66. The method as recited in claim 37, further comprising obtaining said at least a portion of at least one of said electronic map or said access point locator from a map inference device.

67. The apparatus as recited in claim 44, further comprising means for obtaining said at least a portion of at least one of said electronic map or said access point locator from a map inference device.

68. The computing platform as recited in claim 48, wherein the processing unit is further to obtain said at least a portion of at least one of said electronic map or said access point locator from a map inference device.

69. The article as recited in claim 53, wherein said computer implementable instructions are further executable by said processing unit to obtain said at least a portion of at least one of said electronic map or said access point locator from a map inference device.

* * * * *